United States Patent
Paparrizos et al.

(10) Patent No.: US 9,219,372 B2
(45) Date of Patent: Dec. 22, 2015

(54) BUCK BOOST CHARGING FOR BATTERIES

(71) Applicant: QUALCOMM Incorporated, San Diego, CA (US)

(72) Inventors: Georgios K Paparrizos, Foster City, CA (US); Crown Sen Shieh, Santa Clara, CA (US); Shadi Hawawini, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 13/747,186

(22) Filed: Jan. 22, 2013

(65) Prior Publication Data

US 2014/0203761 A1 Jul. 24, 2014

(51) Int. Cl.
*H02J 7/00* (2006.01)
*H02M 3/158* (2006.01)
*H02J 7/02* (2006.01)
*H02M 1/00* (2007.01)

(52) U.S. Cl.
CPC ............... *H02J 7/0052* (2013.01); *H02J 7/022* (2013.01); *H02M 3/1582* (2013.01); *H02M 2001/0009* (2013.01)

(58) Field of Classification Search
CPC .............................. H02J 7/0052; H02J 90/127
USPC .......................... 320/107, 137–141, 145, 149
See application file for complete search history.

(56) References Cited

U.S. PATENT DOCUMENTS

| | | | |
|---|---|---|---|
| 5,714,863 A * | 2/1998 | Hwang et al. | 320/166 |
| 5,734,258 A | 3/1998 | Esser | |
| 7,863,865 B2 | 1/2011 | Hussain et al. | |
| 2005/0093526 A1 | 5/2005 | Notman | |
| 2009/0108677 A1 | 4/2009 | Walter et al. | |
| 2009/0174366 A1 | 7/2009 | Ahmad et al. | |
| 2010/0231172 A1 | 9/2010 | Bastami et al. | |
| 2012/0169126 A1 * | 7/2012 | Totterman et al. | 307/66 |
| 2012/0268075 A1 * | 10/2012 | Wolf et al. | 320/132 |

OTHER PUBLICATIONS

Texas Instruments, "Battery chargers in USB OTG devices", SSZY001, Texas Instruments Incorporated, Jun. 2010, 6pgs.
Huang H-W., et al., "Dithering Skip Modulator with a Novel Load Sensor for Ultra-wide-load High-Efficiency DC-DC Converters", Low Power Electronics and Design. 2006 . ISLPED'06, Proceedings of the 2006 International Symposium on, IEEE, PI, Oct. 1, 2006, pp. 388-393, XP031115588, ISBN: 978-1-59593-462-8 p. 389; figure 3.
International Search Report and Written Opinion—PCT/US2013/022703—ISA/EPO—Oct. 17, 2013.

(Continued)

*Primary Examiner* — Paul Dinh
(74) *Attorney, Agent, or Firm* — Fountainhead Law Group P.C.

(57) ABSTRACT

Disclosed is a battery charging circuit having several operating modes include boost and buck mode, and forward and reverse mode. A power train and a current sensing block may share power transistors thus reducing the number of space-consuming power devices in the circuit. The current sensing block may indicate output current based only a sensed input current, and vice versa.

19 Claims, 16 Drawing Sheets

(56) References Cited

OTHER PUBLICATIONS

Rao S., et al., "A 1.2-A Buck-Boost LED Driver With On-Chip Error Averaged Sense FET-Based Current Sensing Technique", IEEE Journal of Solid-State Circuits, IEEE Service Center, Piscataway, NJ, USA, vol. 46, No. 12, Dec. 1, 2011, pp. 2772-2783, XP011379197.
Ren X., et al., "Three-Mode Dual-Frequency Two-Edge Modulation Scheme for Four-Switch Bucka Boost Converter", IEEE Transactions on Power Electronics, IEEE Service Center, Piscataway, NJ, US, vol. 24, No. 2, Feb. 1, 2009, pp. 499-509, XP011249604.

* cited by examiner

Fig. 6

| operation mode | PWM module 312a | PWM module 312b | HS1 | LS1 | HS2 | LS2 | boot cap refresh signal 314a | boot cap refresh signal 314b |
|---|---|---|---|---|---|---|---|---|
| forward boost conversion | HI | duty$_{f1}$ | ON | OFF | switching | switching | LO | LO |
| reverse buck conversion | HI | duty$_{f2}$ | ON | OFF | switching | switching | LO | LO |
| forward buck conversion | duty$_{f3}$ | HI | switching | switching | ON | OFF | LO | LO |
| reverse boost conversion | duty$_{f4}$ | HI | switching | switching | ON | OFF | LO | LO |

600

BUCK BOOST CHARGING FOR BATTERIES

BACKGROUND

Unless otherwise indicated herein, the approaches described in this section are not prior art to the claims in this application and are not admitted to be prior art by inclusion in this section.

Computer tablets and other mobile devices, such as mobile phones, digital SLR cameras, video recorders, audio devices, and so on are moving to battery packs with two (or more) Li-ion cells in series (so-called "2S" or "3S" stacks or cells). Battery voltages of multi-stack battery packs typically range from 3.0V to 8.4V. Such devices typically are provided with their own power adapters for charging the high voltage battery packs.

The USB specification has become very popular and consumers have become used to being able to charge their USB devices from universal USB power sources. Consumers are used to USB, mini-USB, and micro-USB connectors being present in portable electronics and their use for battery charging from a USB power source. However, since a large majority of USB devices are defined at 5V, it may not be possible to charge high voltage (>5V) 2S or 3S battery packs using a typically USB power source.

SUMMARY

A battery charging circuit in accordance with the present disclosure may include first and second terminals. In some embodiments, power received at the first terminal (e.g., via a power source) may be delivered to a device at the second terminal (e.g., electronics or a battery), and vice-versa. The battery charging circuit may operate in buck mode (power stepped down) or boost (power stepped up) mode, and in the forward mode (power from first terminal delivered to second terminal) or reverse mode (power from the second terminal delivered to the first terminal).

In some embodiments, the battery charging circuit may include a current sensor for sensing current in the one terminal and deriving an indication of current flow in the other terminal based on current flowing in the one terminal.

In some embodiments, the battery charging circuit may include a power train that shares one or more power transistor devices with the current sensor, thereby reducing the space requirement of the circuit.

The following detailed description and accompanying drawings provide a better understanding of the nature and advantages of the present disclosure.

BRIEF DESCRIPTION OF THE DRAWINGS

FIG. 6 is a table illustrating different operational configurations of a buck boost circuit of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
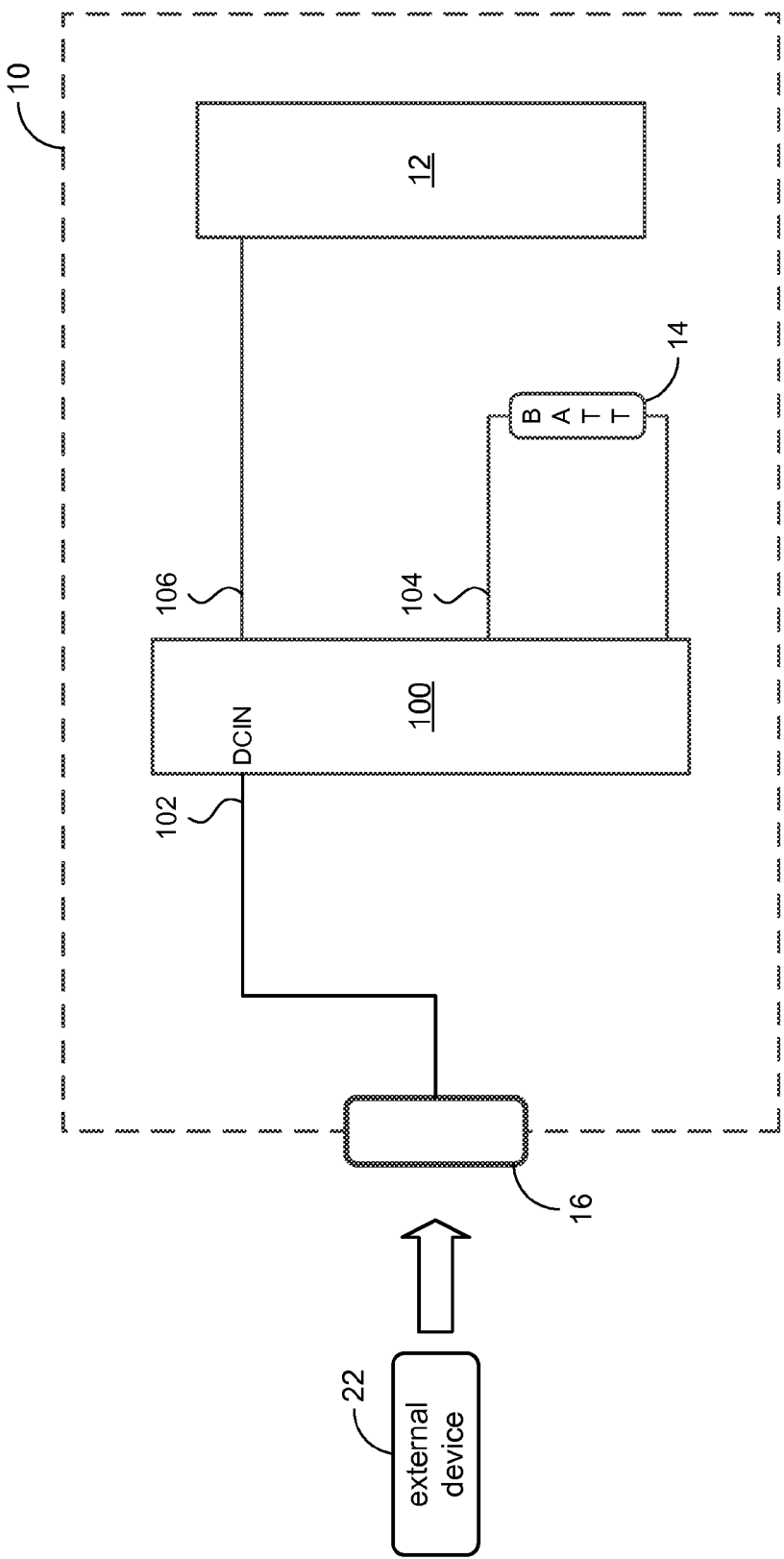
FIG. 1 illustrates a general block diagram of an electronic device that incorporates a battery charging circuit according to the present disclosure.

FIG. 1 shows a high level block diagram of an electronic device 10 that incorporates a battery charging circuit 100 in accordance with the present disclosure. For example, the electronic device 10 may be a smartphone, personal data assistant, portable computer, computing tablet, digital imaging devices, audio devices, and so on.

The battery charging circuit 100 may be connected to a battery 14 to provide power to electronics 12 comprising the electronic device 10. The battery 14 may comprise any suitable type of rechargeable battery cell, such as Li+ ion batteries for example. The battery 14 may further comprise a single battery cell, or more than one battery cell connected in series. Battery 14, for example, may include 2 series-connected battery cells (a "2S stack"), but other configurations involving 3, 4, or more series-connected cells are possible. The battery voltage of such batteries typically range from 6-8.4V but can provide lower or higher voltages.

The electronic device 10 may include a connector 16 for connection to an external device 22. The battery charging circuit 100 may include an input terminal 102 for receiving power from the external device 22 via connector 16. A charging terminal 104 may be included to deliver power from the external device 22 to the battery 14 (e.g., an adapter to recharge the battery). The battery charging circuit 100 may include a system terminal 106 for delivering power from the external device 22 to the electronics 12, for example, while recharging the battery 14.

Figure 1A:
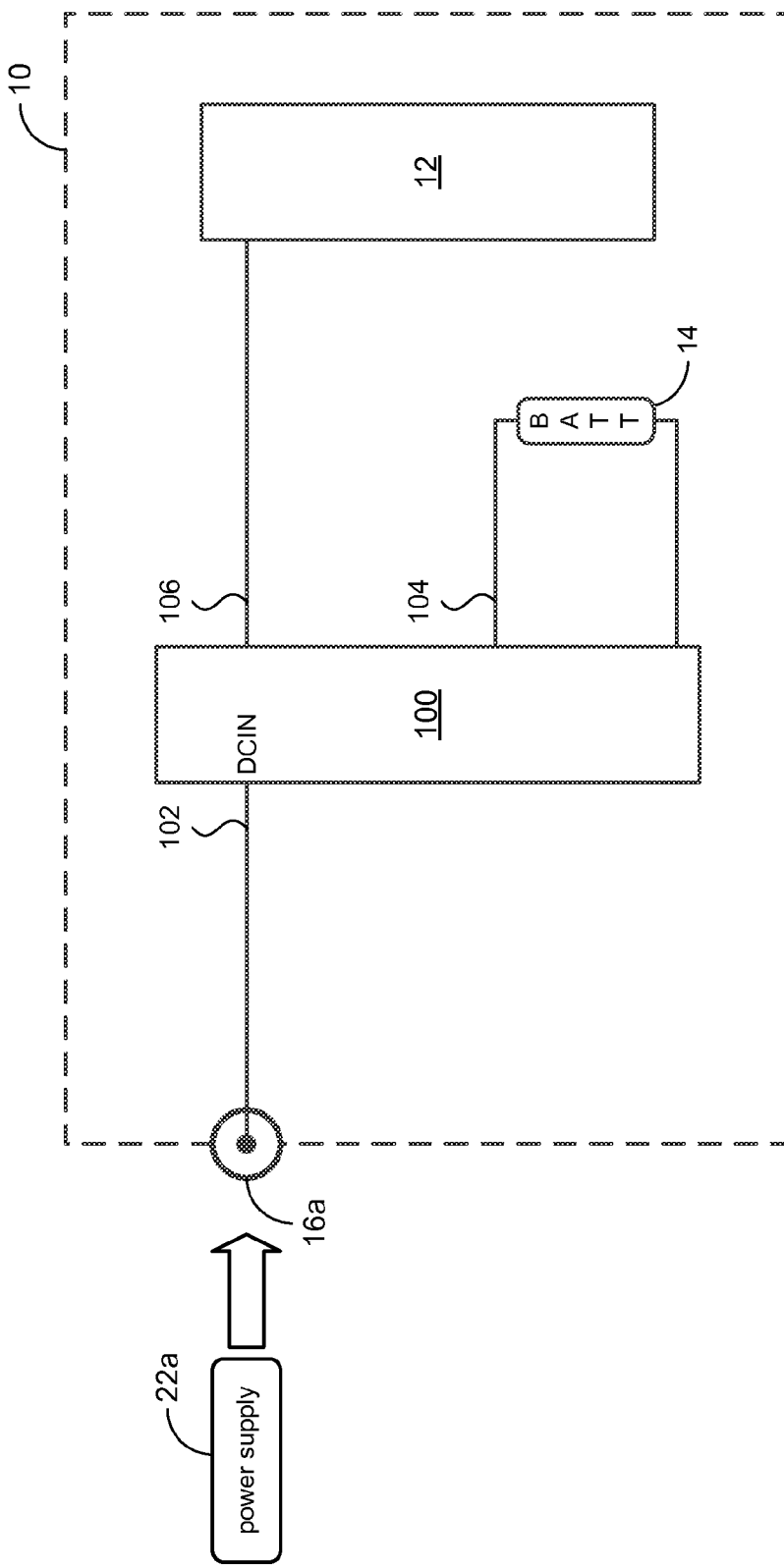
FIGS. 1A, 1B, and 1C illustrate specific illustrative examples of FIG. 1.
Figure 1B:
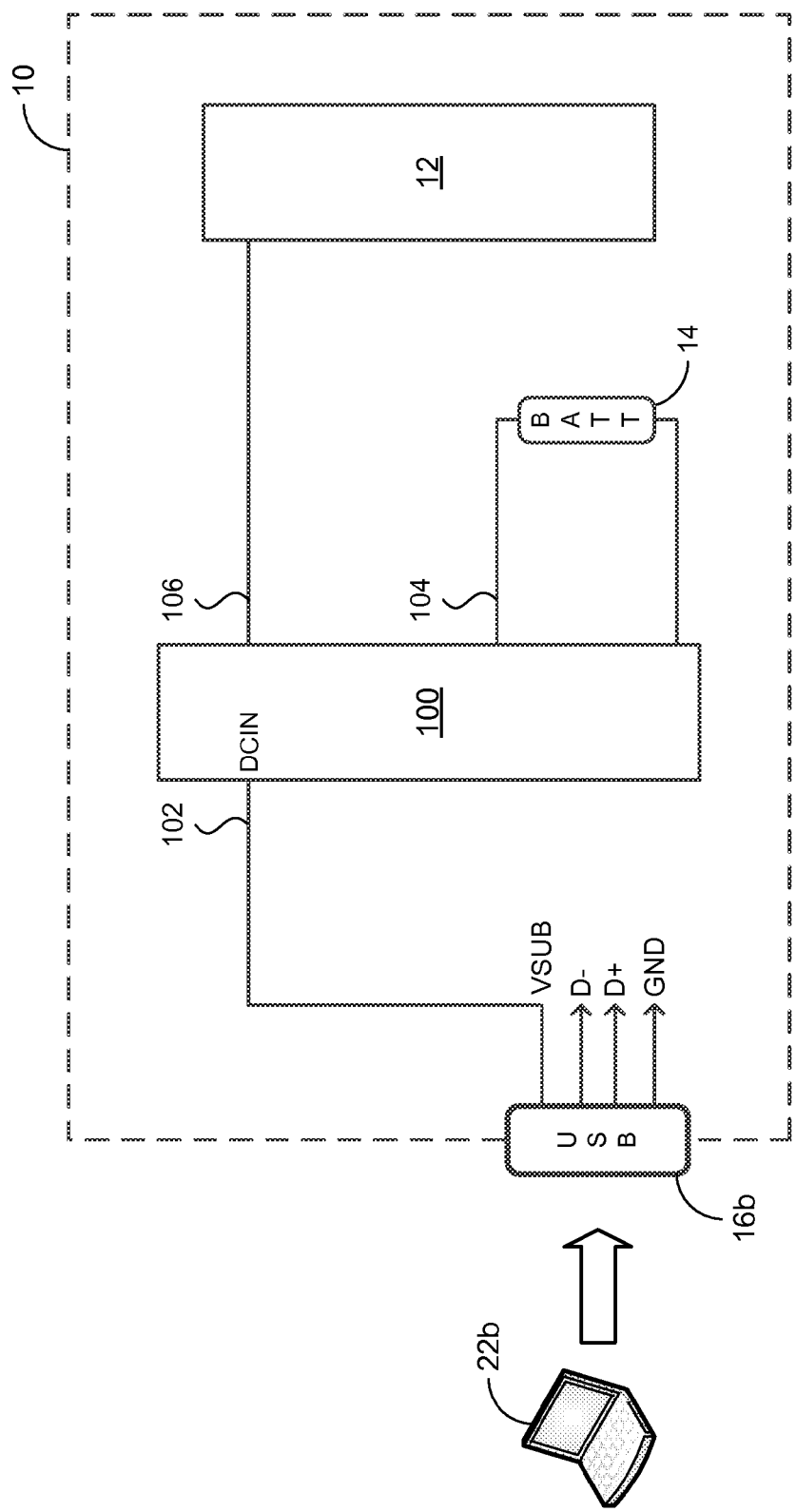
Figure 1C:
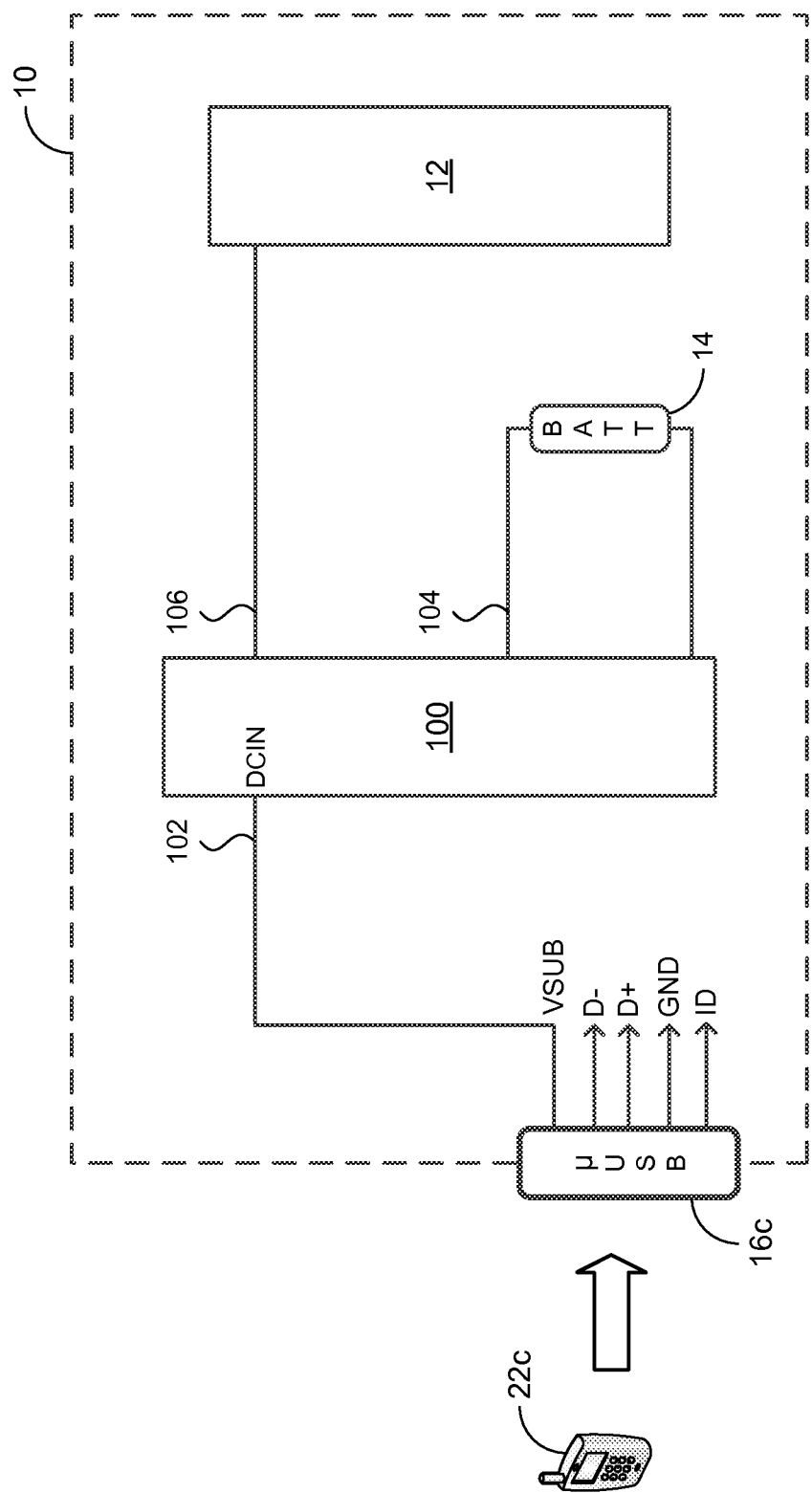

Referring for a moment to FIG. 1A, in some embodiments, an external power supply 22a may be connected to the electronic device 10 via a power connector 16a. For example, the external power supply 22a may be an AC/DC adapter. The external power supply 22a may be used to charge battery 14 and/or provide power to electronics 12. Likewise, referring to FIG. 1B, in some embodiments, an electronic device 22b may be connected to the electronic device 10 via a general connector 16b. For example, the electronic device 22b may be laptop computer. FIG. 1B shows connector 16b to be a USB connector (see also FIG. 1C, which illustrates a micro-USB connector 16c), but it will be appreciated that other embodiments may employ any other suitable connector types. In some embodiments, the electronic device 10 may incorporate both kinds of connectors 16a and 16b on the device; e.g., for connecting to an external power source 22a and/or to an electronic device 22b.

Returning to FIG. 1, the battery charging circuit 100 may provide several operating modes. As used herein, "forward mode" operation will refer to an operating mode of the battery charging circuit 100 wherein power from the external device 22 is delivered (via input terminal 102) to the charging terminal 104 and/or to the system terminal 106. The battery charging circuit 100 may operate in a "reverse mode" in which a battery 14 connected to the charging terminal 104 provides power to an external device 22 connected to the input terminal 102.

Figure 2:
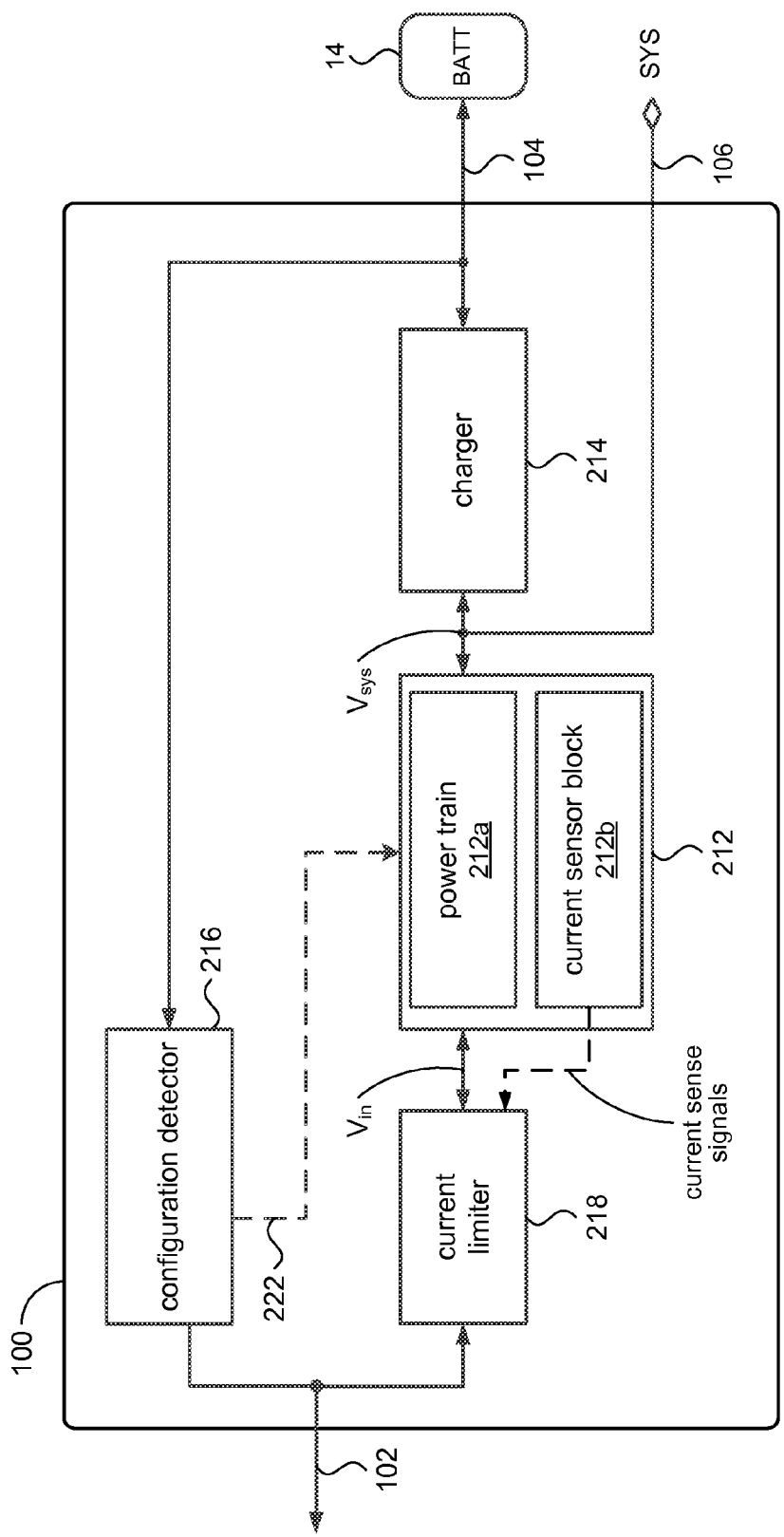
FIG. 2 is a high level block diagram of a battery charging circuit according to the present disclosure.

FIG. 2 illustrates a high level logical block diagram showing various functional circuit blocks of the battery charging circuit 100 in accordance with the present disclosure. In some embodiments, the battery charging circuit 100 may include a buck boost circuit 212, comprising a power train 212a and a current sensor block 212b. As will be discussed in more detail below, in some embodiments, the buck boost circuit 212 may operate as a buck converter or as a boost converter to transfer energy between the input terminal 102 and charging terminal 104 (or system terminal 106) in either forward mode or reverse mode.

In accordance with principles of the present disclosure, the battery charging circuit 100 may accommodate different configurations of voltage level requirements between the input terminal 102 and the charging terminal 104 and/or the system terminal 106 in forward mode. For example, the voltage level at the input terminal 102 may be higher than the voltage level of a battery 14 connected to the charging terminal 104, in which case the battery charging circuit 100 may operate in a "forward buck" mode in order to step down the voltage level to a suitable level. Conversely, if the voltage level at the input terminal 102 is lower than what is needed by the battery 14, then the battery charging circuit 100 may operate in a "forward boost" mode in order to step up the voltage level to a suitable level.

The battery charging circuit 100 may accommodate different configurations of voltage level requirements between the charging terminal 104 and the input terminal 102 in reverse mode. For example, the voltage level of a battery 14 connected to the charging terminal 104 may be higher than is required by an electronic device 22 connected to the input terminal 102, in which case the battery charging circuit 100 may operate in a "reverse buck" mode to step down the battery voltage to a suitable level. Conversely, if the battery voltage is lower than is required by the electronic device 22, then the battery charging circuit 100 may operate in a "reverse boost" mode to step up the voltage to a suitable level.

Referring again to FIG. 1A, as an example, the external power supply 22a (e.g., AC/DC adapter) may be connected to the electronic device 10 to charge the battery 14. In some cases, the external power supply 22a may output a voltage level that is higher than the voltage level of battery 14, or higher than the rated operating voltage for the electronics 12. In accordance with the present disclosure, the buck boost circuit 212 may be operated as a forward buck mode converter to reduce the voltage that is delivered from input terminal 102 to charging terminal 104 or system terminal 106.

As another example, the external power supply 22a may provide a voltage level that is lower than the voltage level of the battery 14; e.g., the power supply may be a USB supply that outputs 5V (per the USB specification) while the battery 14 is an 8.4V battery, or the external power supply may not supply sufficient voltage to operate the electronics 12. Similarly, with reference to FIG. 1B, the electronic device 22b may be a USB device that outputs only 5V, but must charge an 8.4V battery, or provide power to electronics 12 that require more than 5V to operate. Accordingly, the buck boost circuit 212 may be operated as a forward boost converter to increase the voltage level that is received at input terminal 102 to produce a suitable voltage level at charging terminal 104 or system terminal 106.

In yet another example, the buck boost circuit 212 may operate as a buck converter in the reverse direction to transfer energy received from battery 14 connected to charging terminal 104 to a device 22 connected to input terminal 102. Referring to FIG. 1B, for example, the battery 14 may supply 8.4V to electronic device 22b which is rated to operate at lower voltage level, namely 5V per the USB specification. In general, if the battery voltage supplies a higher voltage level than is suitable for the device 22, then reverse mode buck operation may be initiated.

Returning to FIG. 2, the current sensor block 212b may provide in-circuit current sensing for various power management functions, for example, to monitor the battery current during charging, to provide overcurrent protection, to provide current limiting, and so on. Outputs from the current sensor block 212b may be used by the battery charging circuit 100 and by circuitry outside of the battery charging circuit to perform their power management functions. In some embodiments, the current sensor block 212b may comprise a sense resistor connected to the input terminal 102 and a voltage detector to detect an IR drop across the sense resistor. The detected IR drop would be representative of the input current. In other embodiments, a field effect transistor (FET) may be used. In still other embodiments, the current sensor block 212b may provide several current signals. As will be explained in more detail below, the current sensor block 212b may comprise first and second current sensor circuits (not shown in FIG. 2) for respective forward mode operation and reverse mode operation. Each current sensor circuit may generate current signals that indicate the current flowing in the input terminal 102 and in the system terminal 106.

An output of the buck boost circuit 212 may drive a charger 214 (e.g., a linear charger, or any other suitable circuit) that is connected to the charging terminal 104 to provide a charging current for battery 14. System terminal 106 may take the output of the buck boost circuit 212 to power the electronics 12 directly.

A configuration detector 216 may determine whether to operate the buck boost circuit 212 as a buck converter or a boost converter, and in the forward mode or in the reverse mode. In some embodiments, the configuration detector 216 may generate suitable signals 222 that are used to configure the buck boost circuit 212 to operate accordingly.

In accordance with the present disclosure, the battery charging circuit 100 may include a current limiter 218 in order to limit the current flow through the buck boost circuit 212 according to current signals produced in the current sensor block 212b. Limiting the current through terminal 102 may prevent excessive current levels that can damage the external device 22 connected to terminal 102. Adherence to industry standards may require that the battery charging circuit 100 provide current limiting capability; for example, the USB specification imposes current limits for various devices that can be connected to the battery charging circuit.

Figure 3:
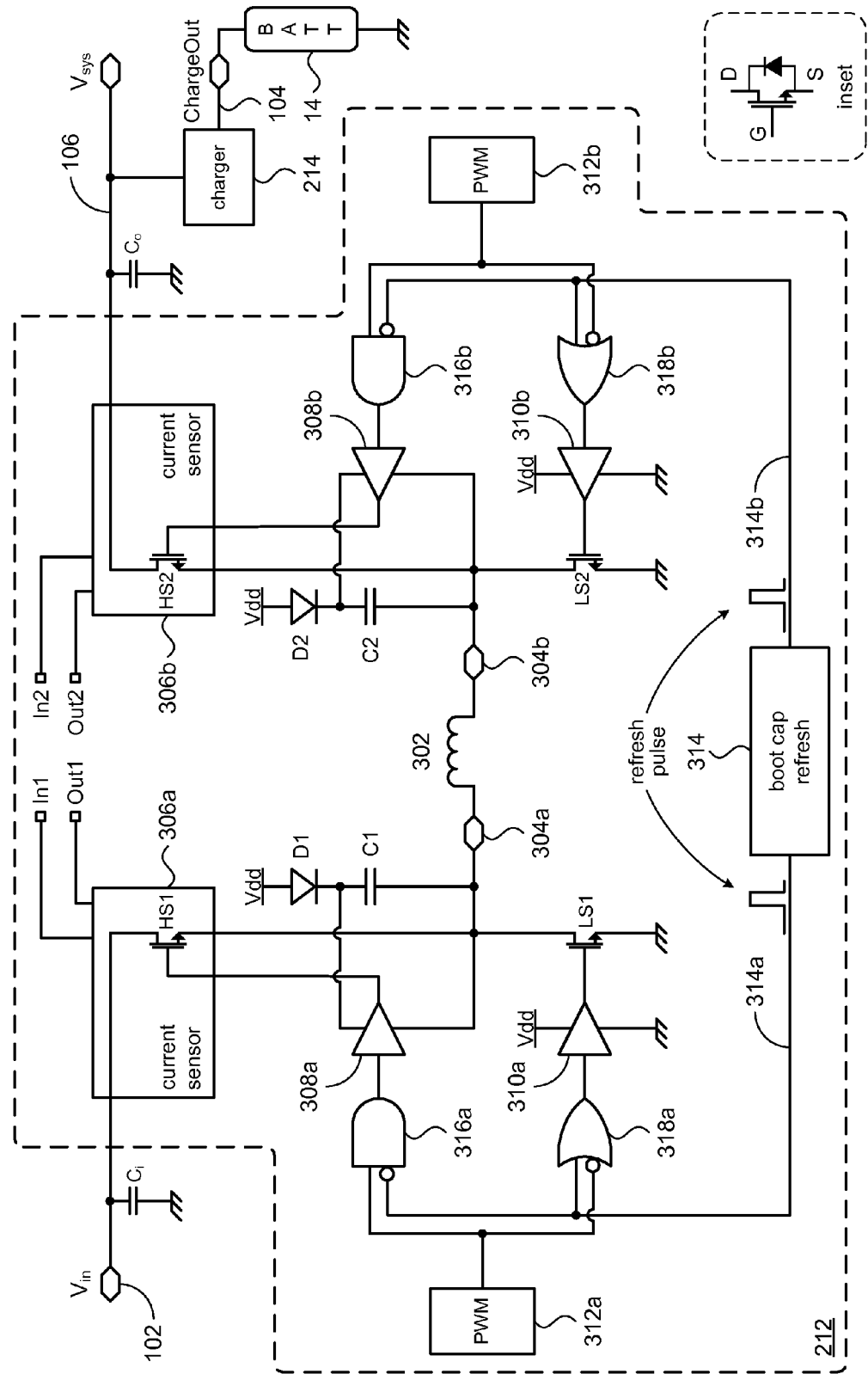
FIG. 3 is a high level block diagram of a buck boost circuit according to the present disclosure.
Figure 3A:
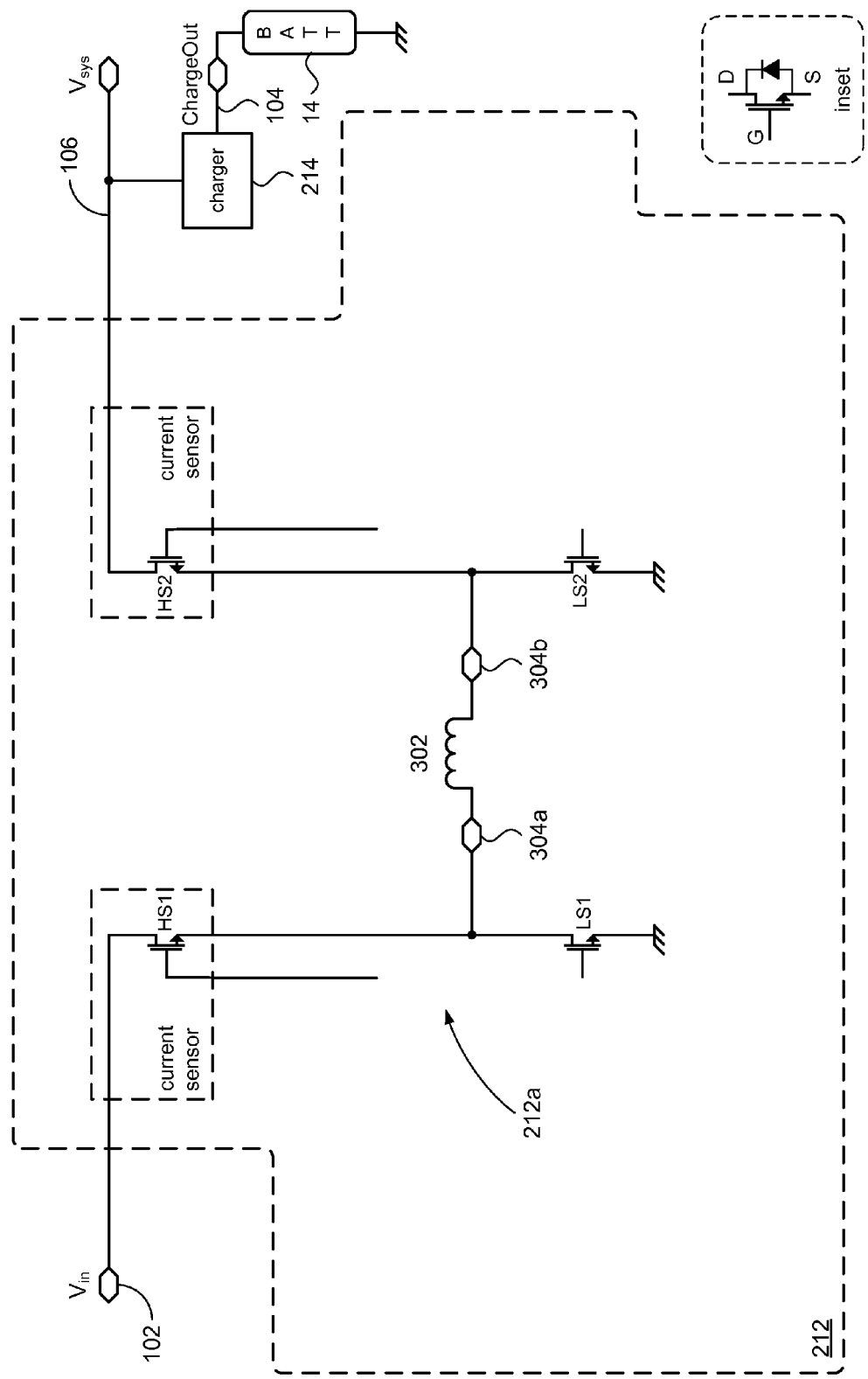
FIG. 3A is a simplified view of FIG. 3 showing the power train.

FIG. 3 illustrates an example of a buck boost circuit 212 in accordance with the present disclosure. The power train 212a (FIG. 2) in the buck boost circuit 212 may comprise a first switching circuit comprising power transistor HS1 and LS1, and a second switching circuit comprising power transistors HS2 and LS2. FIG. 3A illustrates the components of the power train 212a more clearly. In some embodiments, the power transistors HS1, LS1, HS2, and LS2 may be N-type MOSFETs (e.g., NMOS devices), although in other embodiments, the power transistors may be of another suitable design. The inset in FIG. 3 shows that the power transistors HS1, LS1, HS2, and LS2, each intrinsically has a body diode that prevents current flow in the reverse direction (from source S to drain D) when the transistor is in the OFF state.

The power train 212a may include an inductor 302 connected between the first switching circuit HS1/LS1 and the second switching circuit HS2/LS2 in an H-bridge configuration. In some embodiments, the inductor 302 may be "off-chip" with respect to the battery charging circuit 100. For example, the battery charging circuit 100 may be provided on an integrated circuit (IC) chip (not shown). The IC chip may provide pins at nodes 304a, 304b to which the inductor 302 (as an external device) can be connected. In other embodiments, the inductor 302 may be an on-chip device that is connected to nodes 304a, 304b.

In some embodiments, the current sensor block 212b of the buck boost circuit 212 may comprise a first configurable current sensor circuit 306a and second configurable current sensor circuit 306b. The current sensor circuit 306a may be connected to the input terminal 102 to sense a current flow across the input terminal. In accordance with principles of the present disclosure, the current sensor circuit 306a may be configured to operate in forward boost mode, in which a current signal In1 indicates a sensed current flowing into the input terminal 102. In accordance with the present disclosure, the current sensor circuit 306a may obtain (derive) a current signal Out1, from the sensed current signal In1, that represents a level of current flow out of the system terminal 106. The current sensor circuit 306a may operate in reverse buck mode, in which the current signal Out1 indicates a sensed current level flowing out of the input terminal 102 and the current signal In1 (obtained from Out1) represents a level of current flowing into system terminal 106 (e.g., from battery 14).

Similarly, the current sensor circuit 306b may be connected to the system terminal 106 to sense a current flow across the system terminal. In accordance with principles of the present disclosure, the current sensor circuit 306b may operate in a forward buck mode, in which the current signal Out2 indicates a level of current flowing out of the system terminal 106 and the current signal In2 (obtained from Out2) indicates a level of current flowing into input terminal 102. The current sensor circuit 306b may operate in a reverse boost mode, in which a current signal In2 indicates a level of current flowing into the system terminal 106 (e.g., from battery 14). A current signal Out2 may be obtained from current signal In2 that represents a level of current flow out of the input terminal 102.

In accordance with principles of the present disclosure, the current sensor circuits 306a and 306b may share power transistors used in the power train 212a. In an embodiment, for example, the power transistor HS1 may be shared between the first switching circuit of power train 212a and the current sensor circuit 306a. Similarly, the power transistor HS2 may be shared between the second switching circuit of power train 212a and current sensor circuit 306b. Power transistors require large areas of silicon to implement as compared to small signal transistor devices. Accordingly, this aspect of the present disclosure results in significant savings in silicon area, which may be important in small device applications such as mobile devices, compact cameras, and the like.

As illustrated in FIG. 3, in some embodiments, the buck boost circuit 212 may include drivers 308a, 310a, 308b, and 310b. The drivers 308a, 310a, 308b, and 310b drive the gate terminals of respective power transistors HS1, LS1, HS2, and LS2. The drivers 308a, 310a, 308b, and 310b may drive their respective gates with a high voltage level (e.g., 5V) in order to reduce the ON resistance when their corresponding power transistors are in the ON (conducting) state. The power transistors HS1 and HS2 may be referred to as "high side" power transistors, and the power transistors LS1 and LS2 may be referred to as "low side" power transistors. Similarly, drivers 308a and 308b may be referred to as high side drivers, and drivers 310a and 310b may be referred to as low side drivers.

In some embodiments, the high side drivers 308a, 308b may reference their outputs to a floating voltage, namely the voltages respectively at nodes 304a, 304b. Accordingly, each driver 308a, 308b is powered using a corresponding bootstrap floating power supply that references respective nodes 304a, 304b in order to maintain sufficient power for the drivers 308a, 308b to drive the respective gates of HS1, HS2. For example, a first bootstrap floating power supply comprising boot diode D1 and boot capacitor C1 may provide a floating power supply for driver 308a. Likewise, a second bootstrap floating power supply comprising boot diode D2 and boot capacitor C2 may provide a floating power supply for driver 308b. In some embodiments, the boot capacitors C1, C2 may be provided as off-chip components. In other embodiments, the boot capacitors C1, C2 may be on-chip components.

The buck boost circuit 212 may further include a PWM module 312a and a PWM module 312b. The PWM modules 312a, 312b may produce pulse width modulated (PWM) pulses for driving respective pairs of drivers 308a/310a and 308b/310b. The PWM pulses are characterized by a duty cycle, which is typically expressed as the ON time of one switching cycle of a pulse as a percentage of the total period of the switching cycle.

In accordance with the present disclosure, the buck boost circuit 212 may further include a boot cap refresh circuit 314. In accordance with principles of the present disclosure, the boot cap refresh circuit 314 may provide refresh pulse signals on signal lines 314a, 314b to charge either the boot capacitor C1 or the boot capacitor C2. This aspect of the present disclosure will be discussed in more detail below.

Logic circuits 316a, 318a may coordinate the signals from PWM module 312a and the boot cap refresh circuit 314. Similarly, logic circuit 316b, 318b may coordinate the signals from PWM module 312b and the boot cap refresh circuit 314.

Figure 4A:
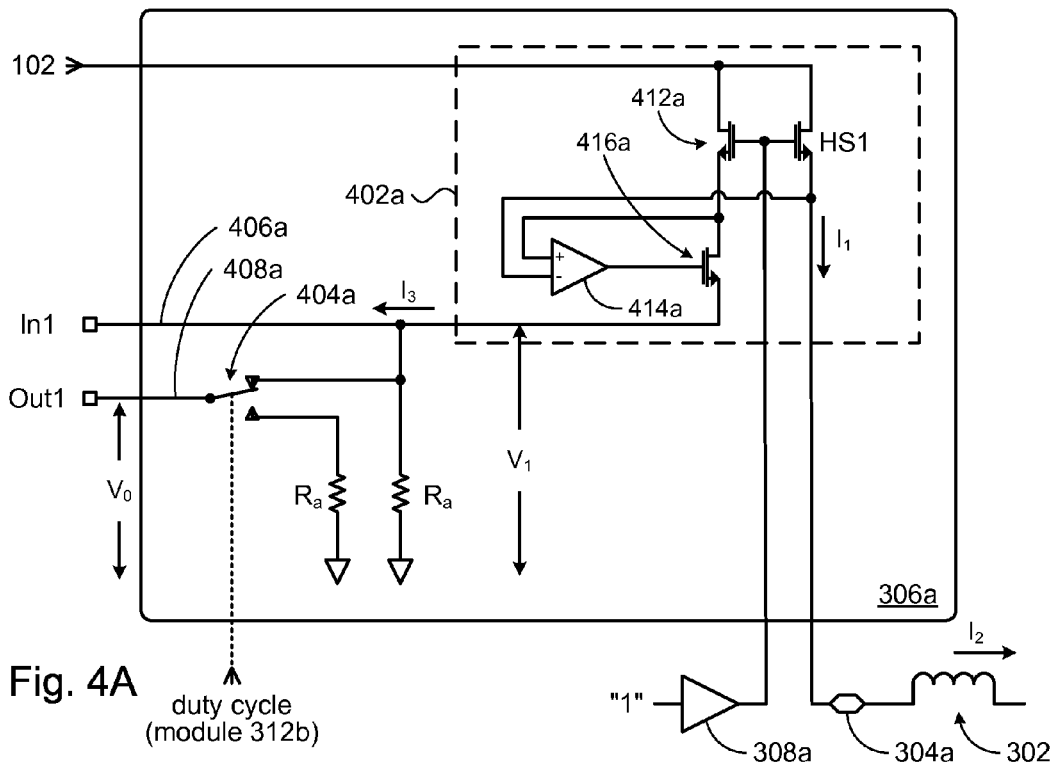
FIGS. 4A and 4B show illustrative embodiments of a first configurable current sensor configured for operation in forward boost mode and reverse buck mode, respectively.
Figure 4B:
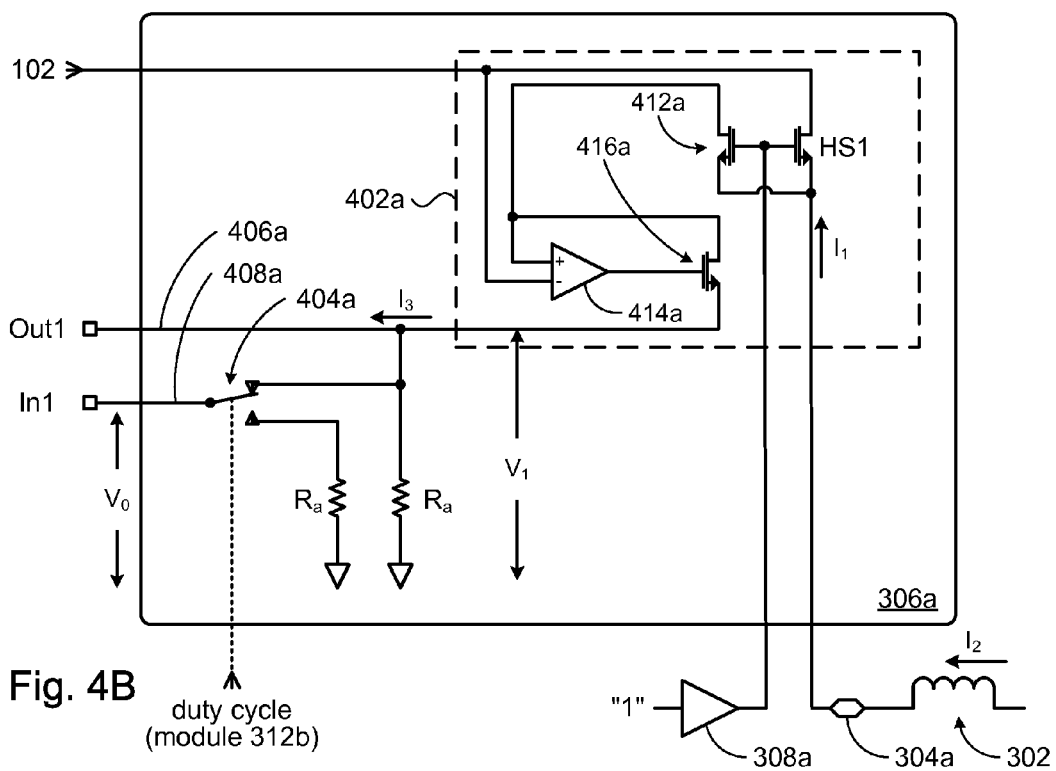

Referring to FIGS. 4A and 4B, an embodiment of the current sensor circuit 306a is shown in two configurations: a forward boost configuration (FIG. 4A) and a reverse buck configuration (FIG. 4B). Referring to FIG. 4A, the current sensor circuit 306a may comprise a current scaling circuit 402a and a switching element 404a. The current scaling circuit 402a may include the high side power transistor HS1 (from the first switching circuit of power train 212a), a current sensing device 412a, a comparator 414a, and an output device 416a. An output 406a of the output device 416a represents current flowing across input terminal 102 that is sensed by the current sensing device 412a. The high side power transistor HS1 and the current sensing device 412a are configured as a current mirror. In some embodiments, the high side power transistor HS1 and the current sensing device 412a may be sized relative to each other to provide a scaling factor of 1:Kc, where Kc is >>1. The output 406a is thus defined by $I_{HS1}/Kc$, where $I_{HS1}$ is the current flow through the high side power transistor HS1.

The switching element 404a alternates its output 408a by switching between output 406a (via a resistor $R_a$) and ground (via another resistor $R_a$). The switching frequency may be controlled by a pulse width modulated signal produced by PWM module 312b.

In accordance with principles of the present disclosure, the current sensor circuit 306a is dynamically reconfigurable, having a configuration for forward boost mode and another configuration for reverse buck mode. In some embodiments, the connections between elements comprising the current scaling circuit 402a and the switching element 404a may be dynamically made. For example, when forward boost mode operation is called for (e.g., via control signals from the configuration detector 216), then elements of the current sensor circuit 306a may be connected as shown in FIG. 4A. The current scaling circuit 402a may include wiring and electronic switches (not shown) at the terminals or nodes of devices 412a, 414a, and 416a that may be operated to configure the topology of the current scaling circuit as shown in FIG. 4A. Similar wiring and electronic switches (not shown) may be provided at outputs 406a and 408a for connection respectively to In1 and Out1. When reverse buck mode operation is called for, then the wiring and electronic switches (not shown) may be operated to configure the topology of the current sensor circuit 306a as shown in FIG. 4B.

Figure 4C:
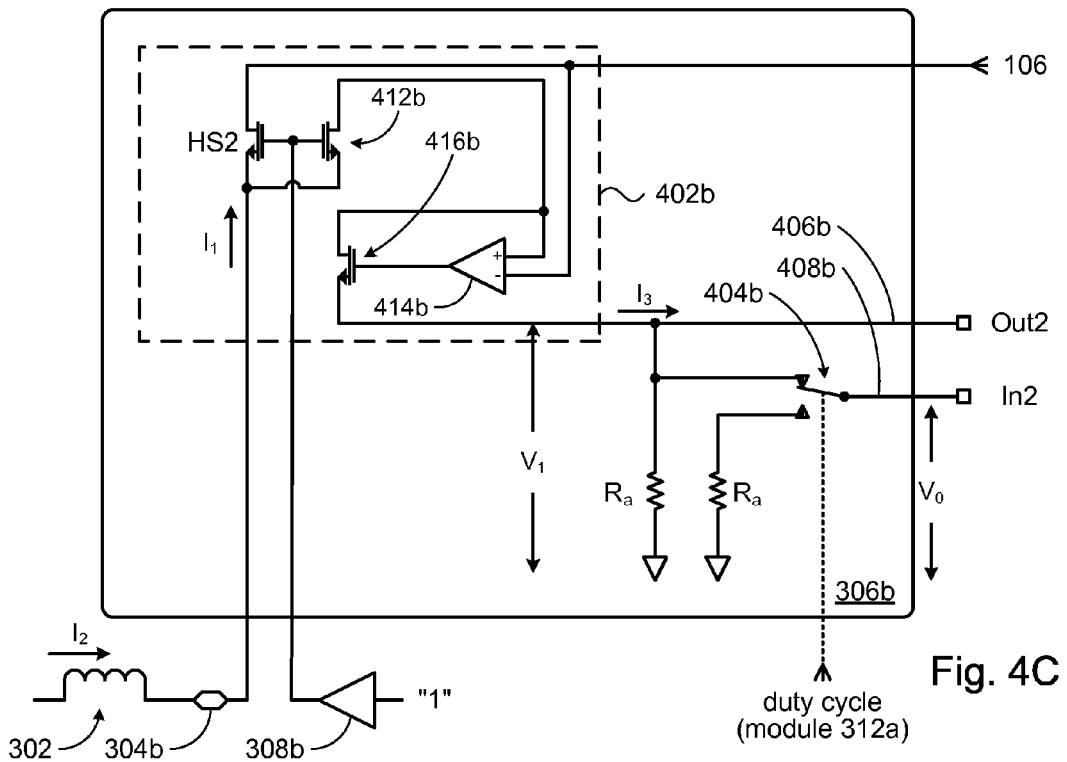
FIGS. 4C and 4D show a second configurable current sensor configured for operation in forward buck mode and reverse boost mode, respectively.

Referring to FIG. 4C, the current sensor circuit 306b may comprise a current scaling circuit 402b and a switching element 404b. The current scaling circuit 402b may include the high side power transistor HS2 (from the first switching circuit of power train 212b), a current sensing device 412b, a comparator 414b, and an output device 416b. An output 406b of the output device 416b represents current flowing across system terminal 106 that is sensed by the current sensing device 412b. The high side power transistor HS2 and the current sensing device 412b are configured as a current mirror. In some embodiments, the high side power transistor HS2 and the current sensing device 412b may be sized relative to each other to provide a scaling factor of 1:Kc, where Kc is >>1. The output 406b is thus defined by $I_{HS2}/Kc$, where $I_{HS2}$ is the current flow through the high side power transistor HS2.

The switching element 404b alternates its output 408b by switching between output 406b (via a resistor $R_a$) and ground (via another resistor $R_a$). The switching frequency may be controlled by a pulse width modulated signal produced by PWM module 312a.

Figure 4D:
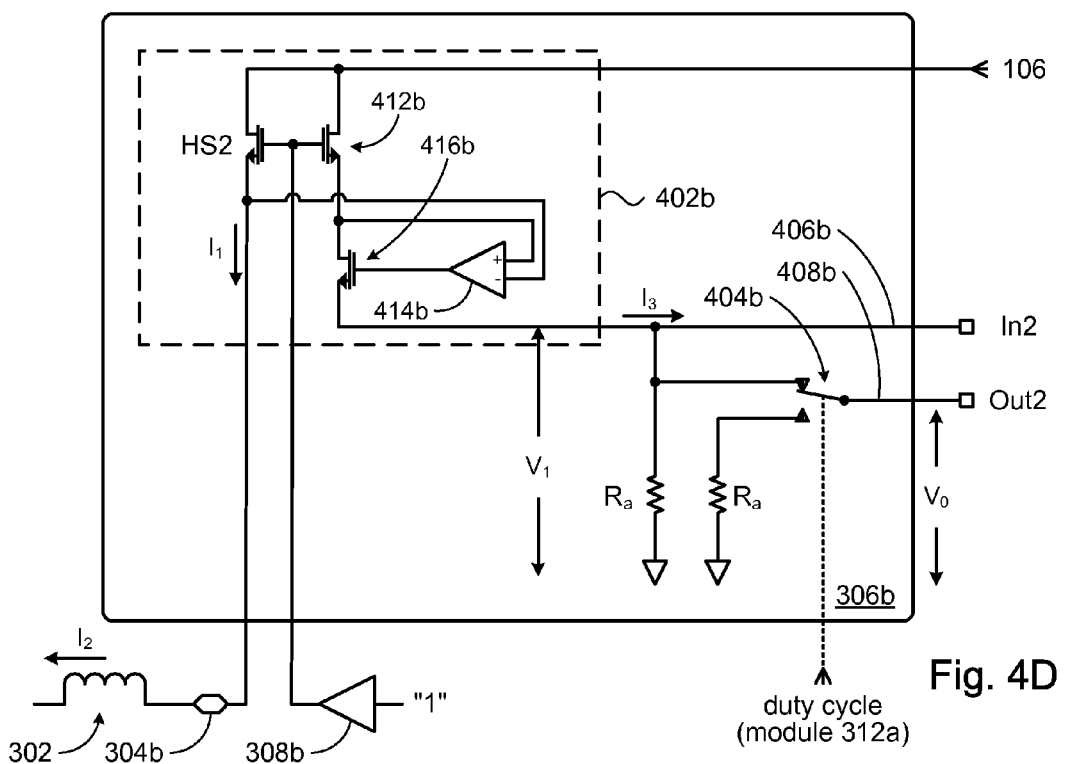

As with current sensor circuit 306a, the current sensor circuit 306b is dynamically reconfigurable, having a configuration for forward buck mode and another configuration for reverse boost mode. In some embodiments, connections between elements comprising the current scaling circuit 402b and the switching element 404b may be dynamically made. For example, when forward buck mode operation is called for (e.g., via control signals from the configuration detector 216), then elements of the current sensor circuit 306b may be connected as shown in FIG. 4C. The current scaling circuit 402b may include wiring and electronic switches (not shown) at the terminals of devices 412b, 414b, and 416b that may be operated to configure the topology of the current scaling circuit as shown in FIG. 4C. Likewise, wiring and electronic switches (not shown) may be provided at outputs 406b and 408b for connection respectively to In2 and Out2. When reverse boost mode operation is called for, then the wiring and electronic switches (not shown) may be operated to configure the topology of the current sensor circuit 306b as shown in FIG. 4D.

Figure 5:
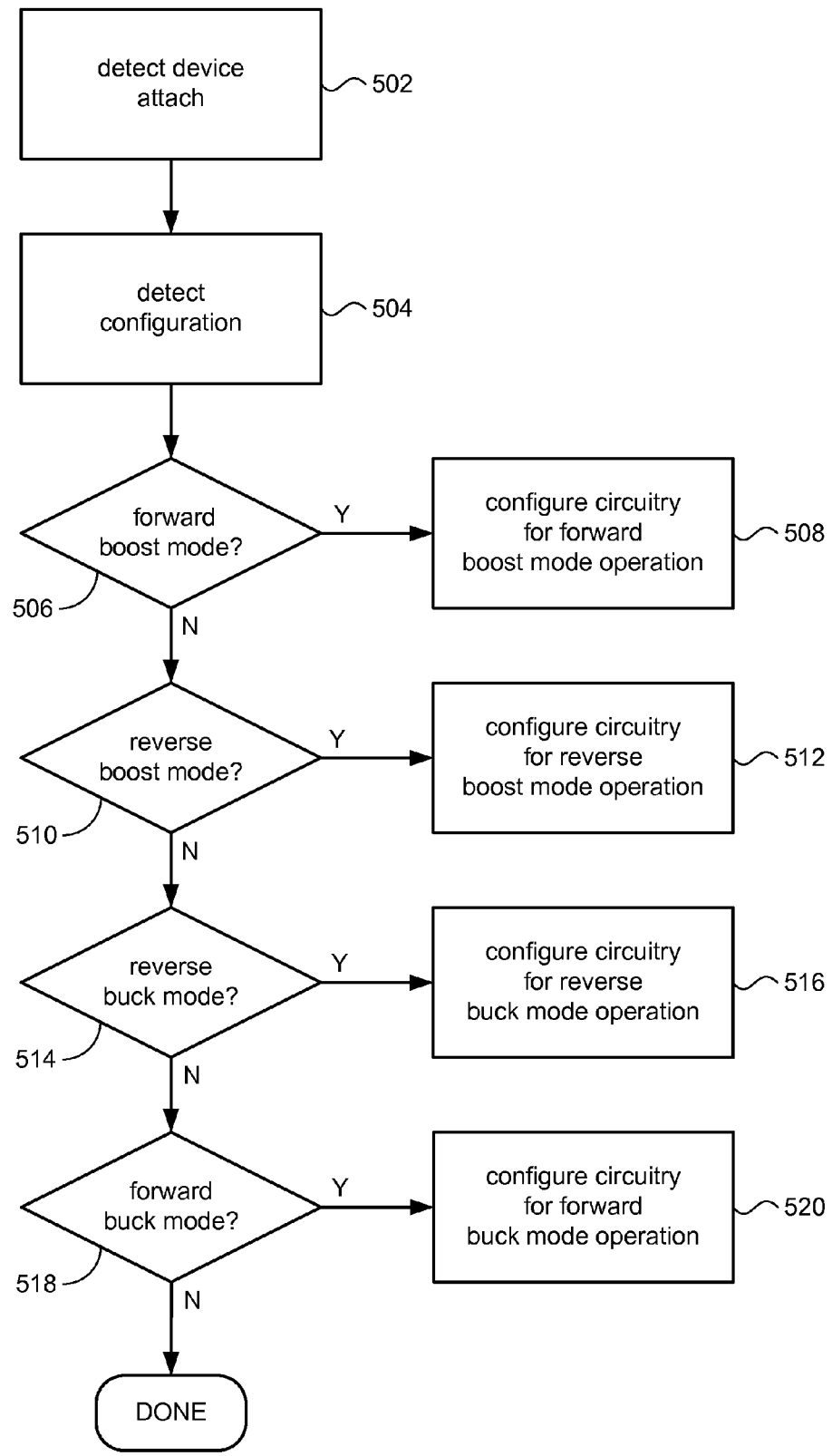
FIG. 5 is a workflow of the battery charging circuit in accordance with the present disclosure.

Operation of the battery charging circuit 100 may be explained using the work flow shown in FIG. 5. At block 502, the battery charging circuit 100 may detect that external device 22 (FIG. 1) has been attached to the electronic device 10. Any technique may be used to detect device attachment. The USB specification, for example, specifies how USB ports can detect the insertion of a USB device.

At block 504, the configuration detector 216 may determine a suitable configuration of operation of the battery charging circuit 100, either buck or boost mode and in the forward or reverse direction. For example, in some embodiments, the configuration detector 216 may use the voltage levels at the input terminal 102 and the charging terminal 104 to determine a proper configuration. In the case of a micro USB port, the configuration detector 216 may use the ID pin to determine the proper configuration, and so on.

If at block 506, the voltage configuration determined at block 504 indicates forward boost mode operation, then at block 508 the battery charging circuit 100 may configure the buck boost circuit 212 for forward boost mode operation. In some embodiments, for example, the configuration detector 216 may assert various control signals (not shown) that can inform the buck boost circuit 212 to configure for forward boost mode. As an example, suppose an external device 22 is connected to the input terminal 102 and the voltage level $V_1$ at input terminal 102 is lower than the voltage level $V_2$ at charging terminal 104. It may therefore be necessary to step up the voltage level $V_1$ to a higher voltage level in order to properly charge the battery 14. If the external device is a USB adapter (or a USB host device) and the battery 14 is a 3S battery pack, then the 5V output of the USB adapter (or device) will be insufficient to fully charge the 3S battery, which may output 12V for instance. Accordingly, the buck boost circuit 212 may be configured for forward boost mode operation to step up the 5V to a higher voltage level. In some embodiments, the system terminal 106 may be electrically connected to charging terminal 104, so a voltage level $V_2$ may appear on system terminal 106 as well.

If at block 510, the voltage configuration determined at block 504 indicates reverse boost mode operation, then at block 512 the battery charging circuit 100 may configure the buck boost circuit 212 for reverse boost mode operation. In some embodiments, this operating mode may be initiated by a "reverse boost mode" signal from an external device connected to the battery charging circuit 100. For example, referring for a moment to FIG. 1C, a device 22c using a micro-USB device may signal the battery charging circuit 100 using its ID pin to operate in reverse boost mode. It will be appreciated that, in other embodiments, the reverse boost mode signal may be generated by the electronics 12. In response, the buck boost circuit 212 may be configured for reverse boost mode operation to step up the battery voltage to a higher voltage level that is suitable for the external device 22c.

If at block 514, the voltage configuration determined at block 504 indicates reverse buck mode operation, then at block 516 the battery charging circuit 100 may configure the buck boost circuit 212 for reverse buck mode operation. In some embodiments, this operating mode may be initiated by a "reverse buck mode" signal from an external device connected to the battery charging circuit 100. For example, referring for a moment to FIG. 1C, a device 22c using a micro-USB device may signal the battery charging circuit 100 using its ID pin to operate in reverse buck mode. It will be appreciated that, in other embodiments, the reverse buck mode signal may be generated by the electronics 12. In response, the buck boost circuit 212 may be configured for reverse buck mode operation to step down the battery voltage to a lower voltage level that is suitable for the external device 22c.

If at block 518, the configuration determined at block 504 indicates forward buck mode operation, then at block 520 the battery charging circuit 100 may configure the buck boost circuit 212 for forward buck mode operation. For example, suppose a power adapter 22a is connected to input terminal 102 and a battery 14 is connected to charging terminal 104. If the voltage level $V_1$ at input terminal 102 is higher than the voltage level $V_2$ at charging terminal 104, then it may be necessary to step down the voltage level $V_1$ to a lower voltage level in order to properly charge the battery 14. Accordingly, the buck boost circuit 212 may be configured for forward buck mode operation. In some embodiments, the system terminal 106 may be electrically connected to charging terminal 104, so a voltage level $V_2$ may appear on system terminal 106 as well.

Referring to FIG. 6, operation of the buck boost circuit 212 in accordance with the present disclosure will be described using the table 600 shown in the figure. When the battery charging circuit 100 determines which mode of operation is appropriate, then the battery charging circuit may activate the PWM modules 312a, 312b, and boot cap refresh circuit 314 according to the table 600.

Figure 7A:
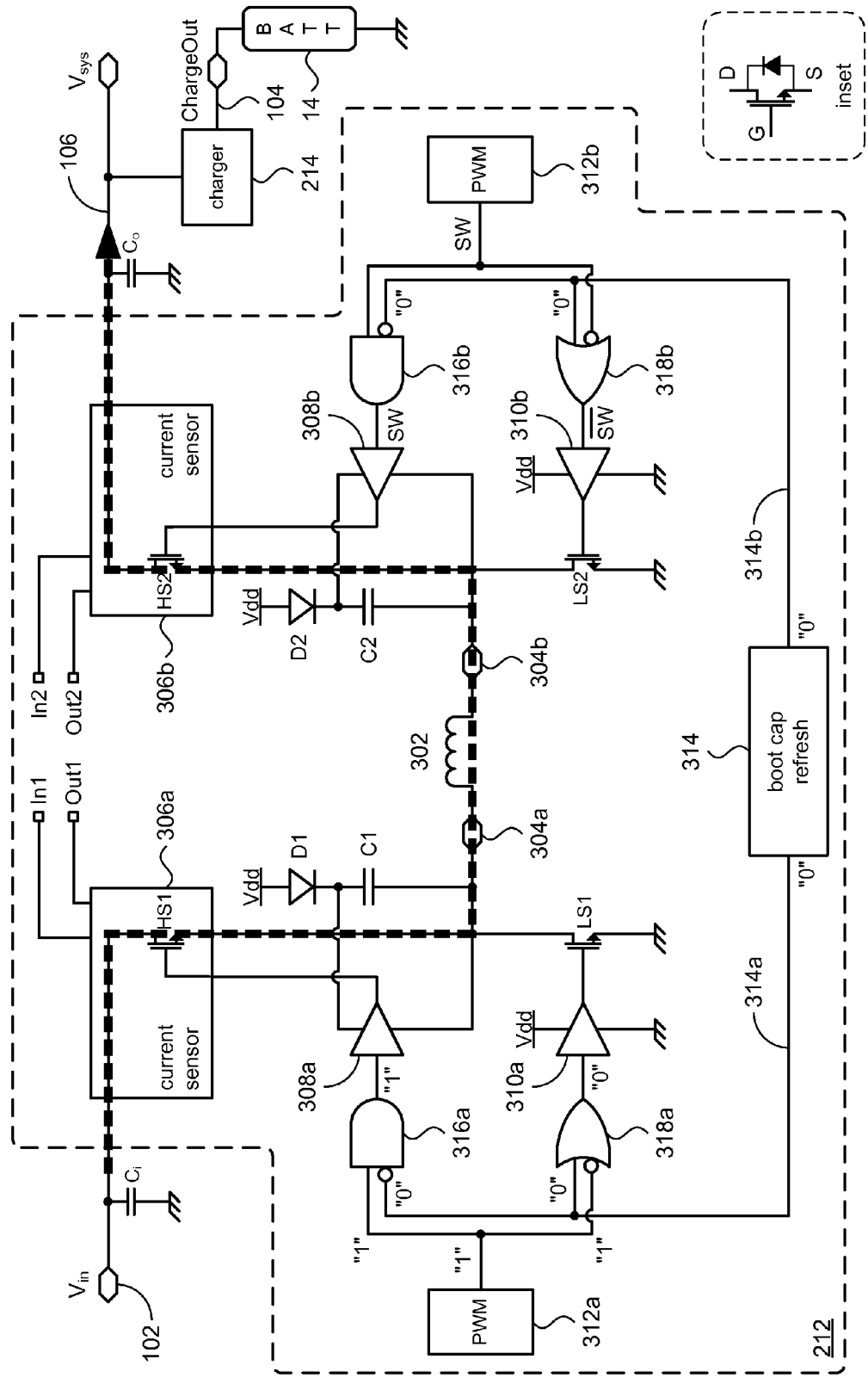
FIGS. 7A, 7B, 7C, 7D illustrate different operational configurations of the buck boost circuit of the present disclosure.

Thus, referring to table 600, if forward boost mode operation is appropriate, the PWM module 312b may be controlled to generate pulses SW having a duty cycle of $duty_{f1}$. The PWM module 312a may be controlled to assert HI on its output. The boot cap refresh circuit may be controlled to assert LO at signal lines 314a, 314b. In response, the buck boost circuit 212 will operate as shown in FIG. 7A. Logic circuit 318a will output LO and thus maintain low side power transistor LS1 in a constant OFF (non-conducting) state. Logic circuit 316a will output HI and thus maintain high side power transistor HS1 in a constant ON (conducting) state. High side power transistor HS2 and low side power transistor LS2 switch according to pulses SW produced by the PWM module 312b at a duty cycle of $duty_{f1}$. More specifically, when HS2 is ON then LS2 is OFF, and vice versa. As indicated by the dashed line in FIG. 7A, power is delivered from the input terminal 102 to the system terminal 106 (and hence to the charging terminal 104 via the charger 214) in forward boost mode.

Figure 8B:
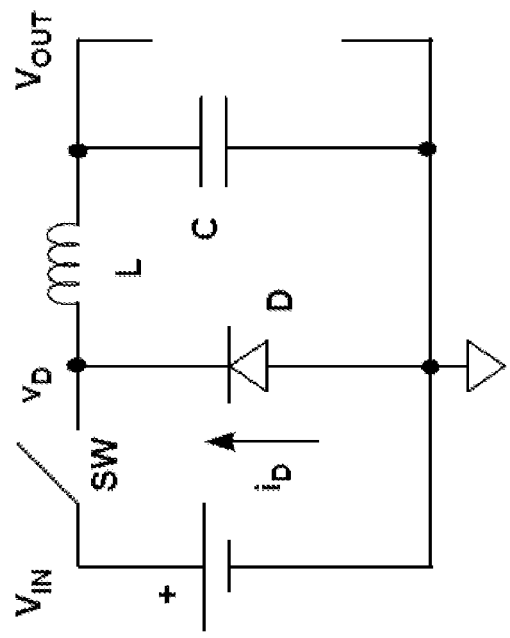
FIGS. 8A and 8B depict, respectively, a conventional boost converter and a conventional buck converter.
Figure 8A:
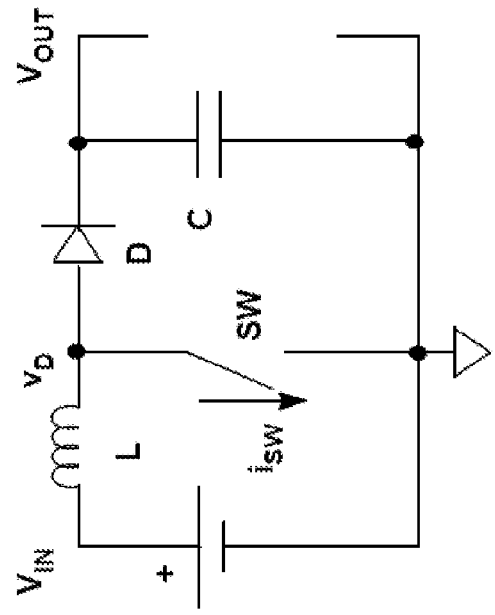

Referring to FIG. 8A, it will be appreciated that the buck boost circuit 212 configured as shown in FIG. 7A operates as a boost converter. One of ordinary skill in the art will appreciate that LS2 constitutes the switching element (SW) of the basic boost converter shown in FIG. 8A. The inductor 302 and the output capacitor $C_o$ respectively correspond to the inductive (L) and capacitive (C) elements. The high side power transistor HS2 functions as the diode (D) element because it behaves as a forward conducting diode in the ON state and acts as a blocking diode in the OFF state by virtue of the transistor's body diode (inset, FIG. 7A).

Figure 7B:
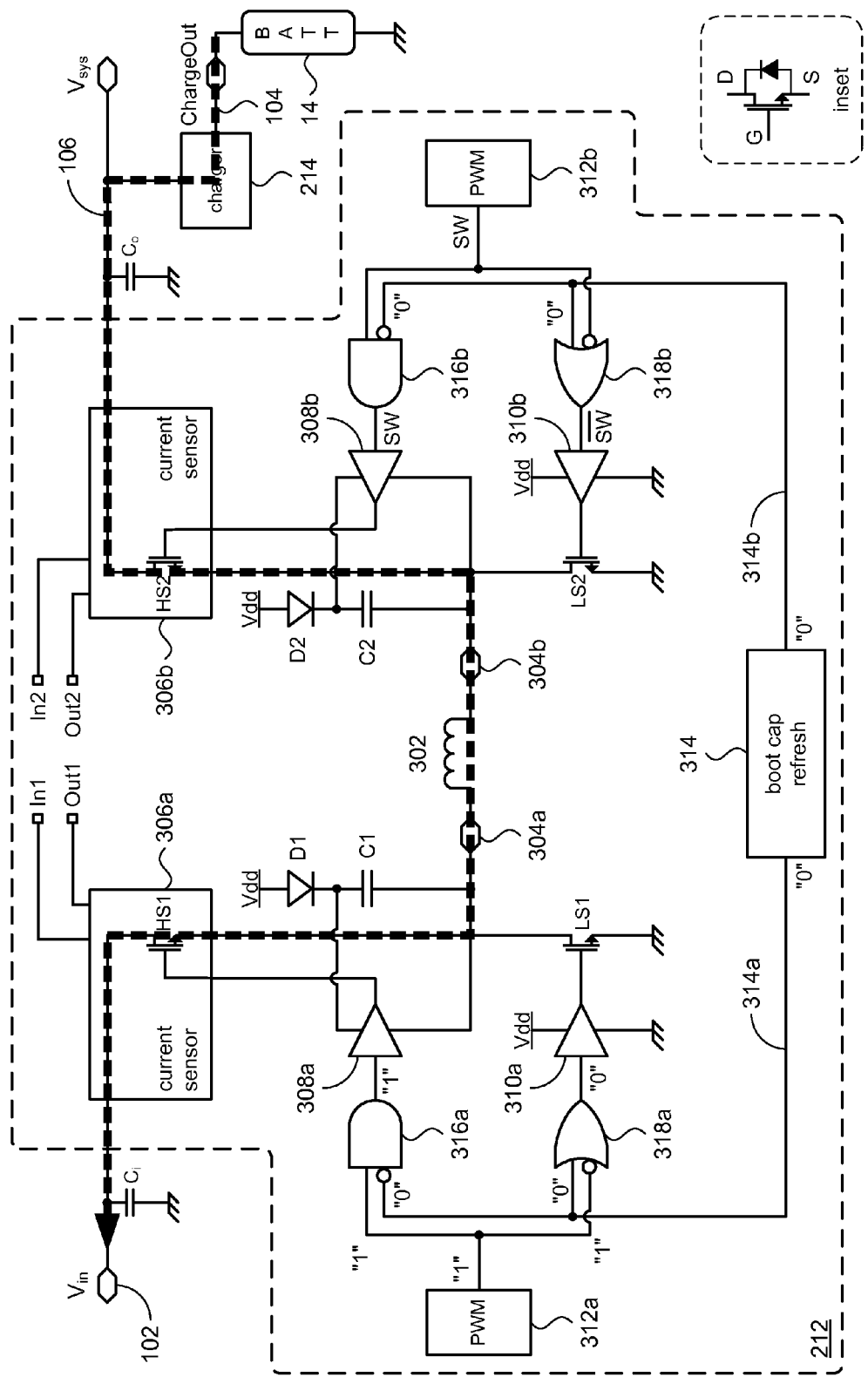

Returning to table 600 in FIG. 6, if reverse buck mode operation is appropriate, the PWM module 312b may be controlled to generate pulses SW having a duty cycle of $duty_{f2}$. The PWM module 312a may be controlled to assert HI on its output. The boot cap refresh circuit may be controlled to assert LO at signal lines 314a, 314b. In response, the buck boost circuit 212 will operate as shown in FIG. 7B. Logic circuit 318a will output LO and thus maintain low side power transistor LS1 in a constant OFF state. Logic circuit 316a will output HI and thus maintain high side power transistor HS1 in a constant ON state. High side power transistor HS2 and low side power transistor LS2 switch according to pulses SW produced by the PWM module 312b at a duty cycle of $duty_{f2}$. More specifically, when HS2 is ON then LS2 is OFF, and vice versa. As indicated by the dashed line in FIG. 7B, power is delivered from the charging terminal 104 to the input terminal 102 in reverse buck mode.

Referring to FIG. 8B, it will be appreciated that the buck boost circuit 212 configured as shown in FIG. 7B operates as a buck converter in the direction from charging terminal 104 to input terminal 102. One of ordinary skill in the art will appreciate that HS2 constitutes the switching element (SW) of the basic buck converter shown in FIG. 8B. The inductor 302 and the input capacitor $C_1$ respectively correspond to the inductive (L) and capacitive (C) elements. The low side power transistor LS2 functions as the diode (D) element because it behaves as a forward conducting diode in the ON state and acts as a blocking diode in the OFF state by virtue of the transistor's body diode (inset, FIG. 7B).

Figure 7C:
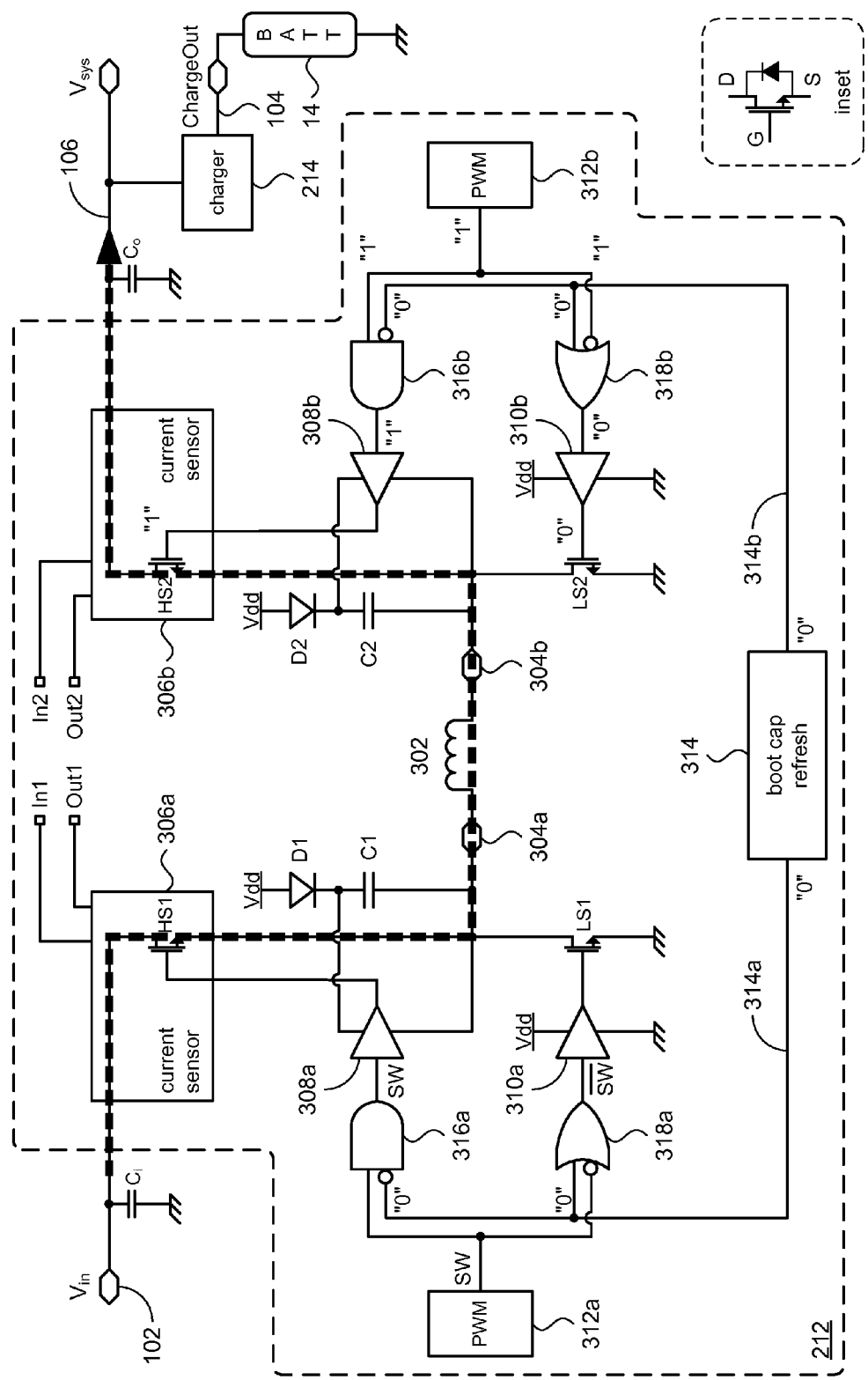

Returning to table 600, if forward buck mode operation is appropriate, the PWM module 312a may be controlled to generate pulses SW having a duty cycle of $duty_{f3}$. The PWM module 312b may be controlled to assert HI on its output. The boot cap refresh circuit may be controlled to assert a LO signal (e.g., "0") at signal lines 314a, 314b. In response, the buck boost circuit 212 will operate as shown in FIG. 7C. Logic circuit 318b will output LO and thus maintain low side power transistor LS2 in a constant OFF state. Logic circuit 316b will output HI and thus maintain high side power transistor HS2 in a constant ON state. High side power transistor HS1 and low side power transistor LS1 switch according to pulses SW produced by the PWM module 312a at a duty cycle of $duty_{f3}$. More specifically, when HS1 is ON then LS1 is OFF, and vice versa. As indicated by the dashed line in FIG. 7C, power is delivered from the input terminal 102 to the system terminal 106 (and hence to the charging terminal 104 via the charger 214) in forward buck mode.

Referring again to FIG. 8B, it will be appreciated that the buck boost circuit 212 configured as shown in FIG. 7C operates as a buck converter. One of ordinary skill in the art will appreciate that HS1 constitutes the switching element (SW) of the basic buck converter shown in FIG. 8B. The inductor 302 and the output capacitor $C_o$ correspond to the inductive (L) and capacitive (C) elements, respectively. The low side power transistor LS1 functions as the diode (D) element because it behaves as a forward conducting diode in the ON state and acts as a blocking diode in the OFF state by virtue of the transistor's body diode (inset, FIG. 7C).

Figure 7D:
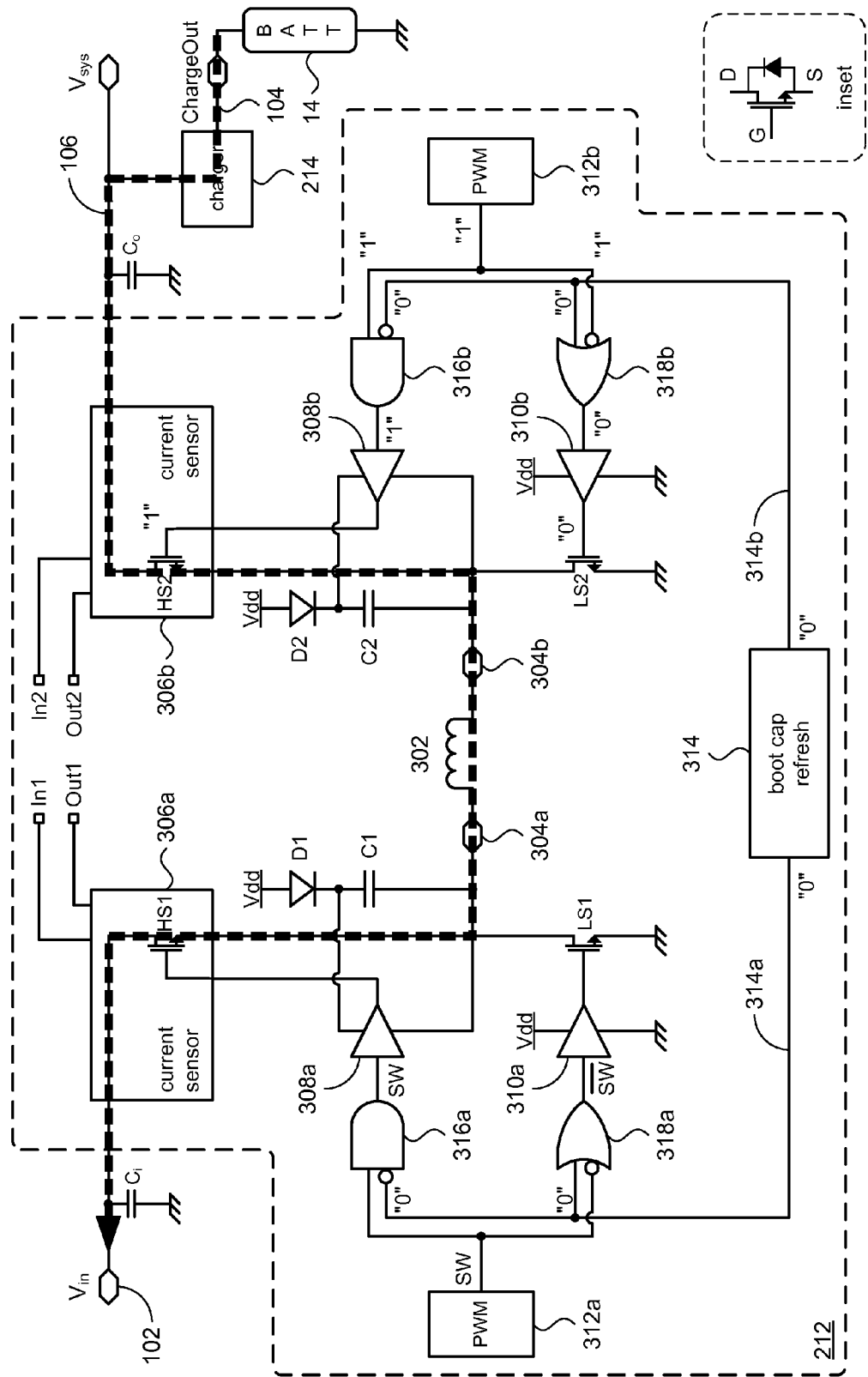

Returning to table 600 in FIG. 6, if reverse boost mode operation is appropriate, the PWM module 312a may be controlled to generate pulses SW having a duty cycle of $duty_{f4}$. The PWM module 312b may be controlled to assert HI on its output. The boot cap refresh circuit may be controlled to assert LO at signal lines 314a, 314b. In response, the buck boost circuit 212 will operate as shown in FIG. 7D. Logic circuit 318b will output LO and thus maintain low side power transistor LS2 in a constant OFF state. Logic circuit 316b will output HI and thus maintain high side power transistor HS2 in a constant ON state. High side power transistor HS1 and low side power transistor LS1 switch according to pulses SW produced by the PWM module 312a at a duty cycle of $duty_{f4}$. More specifically, when HS1 is ON then LS1 is OFF, and vice versa. As indicated by the dashed line in FIG. 7D, power is delivered from the charging terminal 104 via the charger 214 to the input terminal 102 in reverse boost mode.

Referring again to FIG. 8A, it will be appreciated that the buck boost circuit 212 configured as shown in FIG. 7D operates as a boost converter. One of ordinary skill in the art will appreciate that LS1 constitutes the switching element (SW) of the basic boost converter shown in FIG. 8A. The inductor 302 and the input capacitor $C_1$ respectively correspond to the inductive (L) and capacitive (C) elements. The high side power transistor HS1 functions as the diode (D) element because it behaves as a forward conducting diode in the ON state and acts as a blocking diode in the OFF state by virtue of the transistor's body diode (inset, FIG. 7D).

Operation of current sensor 306a configured for forward boost mode operation will be explained with reference to FIGS. 4A and 7A. In this configuration, current sensor 306a senses current in the input terminal 102 as an input current flowing into the battery charging circuit 100, and obtains or derives the current flowing in system terminal 106 as output current flowing out of the battery charging circuit. During forward boost mode, the current sensor 306a is "active" in that the high side transistor HS1 is always ON, while HS2 and LS2 are switching. Current flows in the directions indicated by $I_1$, $I_2$, and $I_3$ in FIG. 4A. The following relations hold:

$$I_1 = I_2$$
$$I_3 = \frac{I_1}{Kc} = \frac{I_2}{Kc}$$
$$V_1 = \frac{R_a I_2}{Kc}$$

where
- $I_1$ is the current flowing from terminal 102 to HS1,
- $I_2$ is the inductor current,
- $I_3$ represents a portion of the current flowing through HS1,
- $V_O$ is an output voltage,
- $V_1$ represent the voltage across resistor $R_a$, and
- Kc is the device scaling factor described above.

During HS2 OFF times, LS2 is ON and current flow through the buck boost circuit 212 takes the following path: input terminal 102, high side power transistor HS1, inductor 302, low side power transistor LS2, and ground. Therefore, during the HS2 OFF times, the current $I_3$ represents the input current, and the voltage $V_1$ across resistor $R_a$ at output 406a represents a sense signal indicative of the input current. Accordingly, voltage $V_1$ at In1 during HS2 OFF times is indicative of the sensed input current of the battery charging circuit 100.

During the HS2 ON times, LS2 is OFF and current flow through the buck boost circuit 212 takes the following path: input terminal 102, HS1, inductor 302, HS2, system terminal 106. Therefore, during HS2 ON times, the current $I_3$ represents the output current. In accordance with principles of the present disclosure, the closing of switching element 404a may be synchronized (time multiplexed) with the ON times of HS2 to extract a signal from output 406a that represents a signal indicative of the output current and provide the extracted signal at output 408a. Thus, the voltage $V_1$ at Out1 during HS2 ON times represents a signal indicative of the output current of the battery charging circuit 100.

Referring to FIGS. 4B and 7B, operation of current sensor 306a configured for reverse buck mode operation will be explained. In this configuration, current sensor 306a senses current in the input terminal 102 as output current flowing out of the battery charging circuit 100 and obtains or derives the current flowing in system terminal 106 as input current (from battery 14 via charging terminal 104) flowing into the battery charging circuit. During reverse buck mode, the current sensor 306a is "active" in that the high side transistor HS1 is always ON, while HS2 and LS2 are switching. Current flows in the directions indicated by $I_1$, $I_2$, and $I_3$ in FIG. 4B. The following relations hold:

$$I_1 = \frac{I_2(Kc-1)}{Kc} \cong I_2$$
$$I_3 = \frac{I_1}{Kc} \cong \frac{I_2}{Kc}$$
$$V_1 \cong \frac{R_a I_2}{Kc}$$

where
- $I_1$ is current flowing from HS1 to terminal 102,
- $I_2$ is the inductor current,
- $I_3$ represents a portion of the current flowing through HS1,
- $V_O$ is an output voltage,
- $V_1$ represent the voltage across resistor $R_a$, and
- Kc is the device scaling factor described above.

During the HS2 OFF times, LS2 is ON and current flow through the buck boost circuit 212 takes the following path: ground, low side power transistor LS2, inductor 302, high side power transistor HS1, and input terminal 102. Therefore, during HS2 OFF times, the current $I_3$ represents the output current, and the voltage $V_1$ across resistor $R_a$ at output 406a represents a sense signal indicative of the output current of the battery charging circuit 100.

During HS2 ON times, LS2 is OFF and current flow through the buck boost circuit 212 takes the following path: system terminal 106, HS2, inductor 302, HS1, and input terminal 102. Therefore, during the HS2 ON times, the current $I_3$ represents the input current. In accordance with principles of the present disclosure, the closing of switching element 404a may be synchronized (time multiplexed) with the ON times of HS2 so that output 408a can be extracted from output 406a that represents a signal indicative of the input current and provide the extracted signal at output 408a. Thus, the voltage $V_1$ at In1 during HS2 ON times represents a signal indicative of the input current of the battery charging circuit 100 from battery 14.

Referring to FIGS. 4C and 7C, operation of current sensor 306b configured for forward buck mode operation will be explained. In this configuration, current sensor 306b senses current in the system terminal 106 as output current flowing out of the battery charging circuit 100 and obtains or derives the current flowing in input terminal 102 as input current flowing into the battery charging circuit. During forward buck mode, the current sensor 306b is "active" in that the high side transistor HS2 is always ON, while HS1 and LS1 are switching. Current flows in the directions indicated by $I_1$, $I_2$, and $I_3$ in FIG. 4C. The following relations hold:

$$I_1 = \frac{I_2(Kc-1)}{Kc} \cong I_2$$
$$I_3 = \frac{I_1}{Kc} \cong \frac{I_2}{Kc}$$
$$V_1 \cong \frac{R_a I_2}{Kc}$$

where
- $I_1$ is the current flowing from HS2 to terminal 106,
- $I_2$ is the inductor current,
- $I_3$ represents a portion of the current flowing through HS2,
- $V_O$ is an output voltage,
- $V_1$ represent the voltage across resistor $R_a$, and
- Kc is the device scaling factor described above.

During HS1 OFF times, LS1 is ON and current flow through the buck boost circuit 212 takes the following path: ground, LS1, inductor 302, HS2, and system terminal 106. Therefore, during the HS1 OFF times, the current $I_3$ represents the output current, and the voltage $V_1$ across resistor $R_a$ at output 406b represents a sense signal indicative of the output current. Accordingly, voltage $V_1$ at Out2 during HS1 OFF times is indicative of the output current of the battery charging circuit 100.

During the HS1 ON times, LS1 is OFF and current flow through the buck boost circuit 212 takes the following path: input terminal 102, HS1, inductor 302, HS2, and system terminal 106. Therefore, during HS1 ON times, the current $I_3$ represents the input current. In accordance with the present disclosure, the closing of switching element 404*b* may be synchronized (time multiplexed) with the ON times of HS1 to extract a signal from output 406*b* that represents a signal indicative of the input current and provide the extracted signal at output 408*b*. Thus, the voltage $V_1$ at In2 during HS1 ON times represents a signal indicative of the input current of the battery charging circuit 100.

Referring to FIGS. 4D and 7D, operation of current sensor 306*b* configured for reverse boost mode operation will be explained. In this configuration, current sensor 306*b* senses current in the system terminal 106 as input current (from battery 14) flowing into the battery charging circuit 100 and obtains or derives the current flowing in input terminal 102 as output current flowing out of the battery charging circuit. During reverse boost mode, the current sensor 306*b* is "active" in that the high side transistor HS2 is always ON, while HS1 and LS1 are switching. Current flows in the directions indicated by $I_1$, $I_2$, and $I_3$ in FIG. 4D. The following relations hold:

$$I_1 = I_2$$
$$I_3 = \frac{I_1}{Kc} = \frac{I_2}{Kc}$$
$$V_1 = \frac{R_a I_2}{Kc}$$

where
$I_1$ is the current flowing from system terminal 106 to HS2,
$I_2$ is the inductor current,
$I_3$ represents a portion of the current flowing through HS2,
$V_0$ is an output voltage,
$V_1$ represent the voltage across resistor $R_a$, and
Kc is the device scaling factor described above.

During HS1 OFF times, LS1 is ON and current flow through the buck boost circuit 212 takes the following path: system terminal 106, HS2, inductor 302, LS1, and ground. Therefore, during the HS1 OFF times, the current $I_3$ represents the input current, and the voltage $V_1$ across resistor $R_a$ at output 406*b* represents a sense signal indicative of the input current. Accordingly, voltage $V_1$ at In2 during HS1 OFF times is indicative of the input current of the battery charging circuit 100.

During the HS1 ON times, LS1 is OFF and current flow through the buck boost circuit 212 takes the following path: system terminal 106, HS2, inductor 302, HS1, input terminal 102. Therefore, during HS1 ON times, the current $I_3$ represents the output current. In accordance with the present disclosure, the closing of switching element 404*b* may be synchronized (time multiplexed) with the ON times of HS1 to extract a signal from output 406*b* that represents a sensed signal indicative of the output current and provide the extracted signal at output 408*b*. Thus, the voltage $V_1$ at Out2 during HS1 ON times represents a sensed signal indicative of the output current of the battery charging circuit 100.

Referring back to FIG. 3, operation of the boot cap refresh circuit 314 will now be discussed. As explained above, the boot capacitors C1, C2 provide a floating reference for respective high side drivers 308*a*, 308*b*. Typically, the boot capacitors C1 and C2 are refreshed during the ON times of respective low side power transistors LS1, LS2. For example, in forward buck mode operation (e.g., FIG. 7C), when LS1 is ON, LS1 provides a path to ground so that boot capacitor C1 can be charged (refreshed) to a level sufficient to operate high side driver 308*a*.

However, under some situations, there may be insufficient time to adequately refresh the boot capacitor C1 or C2. For example, if the ON time for the low side power transistor (LS1 or LS2) is too short (e.g., very high duty cycle), then the discharge rate of the boot capacitor may be greater than the charge rate. A 100% duty cycle means the low side power transistor may not turn on at all. If the battery charging circuit operates in a pulse skipping mode, the period of time between pulses where both the high side and the low side power transistors are turned OFF may be too long.

Referring to the forward buck mode configuration shown in FIG. 7C, when the boot capacitor C1 is charging (refresh) during an ON time of the low side power transistor LS1, a current disturbance may arise in the inductor during the refresh. At the end of the refresh, as the low side power transistor LS1 starts to open (non-conductive state), this disturbance may generate a boost back voltage at the input terminal 102. Likewise, with respect to the forward boost mode configuration shown in FIG. 7A, when the boot capacitor C2 is charging during an ON time of the low side power transistor LS2, a similar current disturbance may arise in the inductor. At the end of the refresh, when the low side power transistor LS2 starts to open, this disturbance may generate an extra boosted voltage that appears the system terminal 106. In addition, the foregoing described current disturbances can create unpredictable inductor current conditions at system initialization in applications where a refresh operation to initialize the boot capacitor may be needed as part of the system initialization.

In accordance with principles of the present disclosure, the boot cap refresh circuit 314 may generate refresh pulses on signal lines 314*a* and 314*b*. In some embodiments, the refresh pulses may be event-driven; for example, when the charge level on a boot capacitor C1 or C2 falls below a threshold level. The charge level in the boot cap can be acquired by measurement or by estimation in the chip.

Referring to FIG. 3, the refresh pulses will force the high side power transistors HS1, HS2 to the OFF state by operation of the inverting input of respective AND gates 316*a*, 316*b*. Turning OFF the high side power transistors HS1, HS2 may prevent current flow into respective terminals 102, 106 during a refresh period, and thus avoid, or at least reduce, the boosted voltage disturbances described above.

At the same time, the refresh pulses will force the low side power transistors LS1, LS2 to the ON state, providing a path to ground so that respective boot capacitors C1, C2 can charge (refresh). The pulse width of the refresh pulses may be based on the time constant of the boot capacitance (e.g., C1) and the boot diode D1 ON resistance.

The above description illustrates various embodiments of the present invention along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A battery charging circuit comprising:
    a first terminal;
    a second terminal configured to provide energy to a battery;
    a power train having a connection to the first terminal and a connection to the second terminal, the power train having a forward boost mode operation and a forward buck mode operation to deliver energy received at the first terminal to the second terminal, the power train having a reverse boost mode operation and reverse buck mode operation to deliver energy received at the second terminal to the first terminal;
    a current sensor block connected to the first terminal and the second terminal, the current sensor block having a first operating mode to sense a current flow in the first terminal and produce a signal indicative of a current flow in the second terminal based on a sensed current flow in the first terminal, the current sensor block further having a second operating mode to sense the current flow in the second terminal and produce a signal indicative of the current flow in the first terminal based on a sensed current flow in the second terminal; and
    a first pulse width modulator (PWM) circuit and a separate second PWM circuit, both connected to the power train, wherein when the first PWM operates in switching mode the second PWM operates in non-switching mode and when the second PWM operates in switching mode the first PWM operates in non-switching mode.

2. The battery charging circuit of claim 1 wherein energy received at the first terminal is from a power source connected to the first terminal and wherein the energy is delivered to a battery connected to the second terminal.

3. The battery charging circuit of claim 2 further comprising a third terminal configured to connect to an electronic circuit, the power train configured to deliver energy received at the first terminal to the third terminal.

4. The battery charging circuit of claim 1 wherein energy received at the second terminal is from a battery and wherein the energy is delivered to a load connected to the first terminal.

5. The battery charging circuit of claim 1 wherein the first PWM circuit operates in switching mode and the second PWM circuit operates in non-switching mode when the power train operates in forward boost mode or in reverse buck mode and wherein the first PWM circuit operates in non-switching mode and the second PWM circuit operates in switching mode when the power train operates in forward buck mode or in reverse boost mode.

6. The battery charging circuit of claim 1 wherein the power train comprises a first switching circuit connected to the first PWM circuit and a second switching circuit connected to the second PWM circuit.

7. The battery charging circuit of claim 1 wherein the current sensor block comprises a first current sensor connected only to the first terminal and having a first output indicative of the sensed current flow in the first terminal and a second output indicative of the current flow in the second terminal.

8. The battery charging circuit of claim 7 wherein the power train operates at a first duty cycle, wherein the second output of the first current sensor is generated from the first output of the first current sensor during ON times of the first duty cycle.

9. The battery charging circuit of claim 7 further comprising a second current sensor connected only to the second terminal and having a first output indicative of the sensed current flow in the second terminal and a second output indicative of the current flow in the first terminal.

10. The battery charging circuit of claim 1 wherein the current sensor block comprises a first current sensor connected only to the first terminal and a second current sensor connected only to the second terminal, wherein the first current sensor is active and the second current sensor is not active when the power train operates in the forward boost mode or the reverse buck mode, wherein the first current sensor is not active and the second current sensor is active when the power train operates in the forward buck mode or the reverse boost mode.

11. The battery charging circuit of claim 1 wherein the current sensor block comprises a first current sensor connected to the first terminal and having a first master transistor, and a second current sensor connected to the second terminal and having a second master transistor,
    wherein the power train comprises a first switching circuit and a second switching circuit,
    wherein a first transistor of the first switching circuit and the first master transistor are the same transistor,
    wherein a first transistor of the second switching circuit and the second master transistor are the same transistor.

12. The battery charging circuit of claim 1 wherein the power train comprises:
    a pair of high side transistors and a pair of low side transistors for connection to an inductor in an H-bridge circuit;
    a high side driver connected to drive one of the high side transistors;
    a capacitor connected to provide a floating power supply to the high side driver that is referenced to the inductor;
    refresh circuitry to generate a refresh pulse that turns OFF the high side transistors to prevent boosting the voltage at the first terminal or the second terminal and turns ON the low side transistors to charge the capacitor thereby refreshing the capacitor.

13. The battery charging circuit of claim 12 wherein the refresh circuitry generates a refresh pulse when the charge voltage on the capacitor falls below a predetermined level.

14. An electronic device comprising a battery charging circuit according to claim 1 and a load connected to the battery charging circuit.

15. A battery charging circuit comprising:
    a buck boost circuit having a first terminal and a second terminal, the second terminal configured to connect to a battery,
    the buck boost circuit configured to operate in a forward buck mode or a forward boost mode to provide power provided at the first terminal to the second terminal, the buck boost circuit further configured to operate in a reverse buck mode or a reverse boost mode to provide power received from a battery connected to the second terminal to the first terminal,
    the buck boost circuit further having a current sensor block,
    the current sensor block configured to operate in a first mode to sense a current flow in the first terminal and produce a signal representative of a current flow in the second terminal based on the current flow sensed in the first terminal, the current sensor block further configured to operate in a second mode to sense the current flow in the second terminal and produce a signal representative of the current flow in the first terminal based on the current flow sensed in the second terminal, wherein the buck boost circuit comprises:
a pair of high side transistors and a pair of low side transistors for connection to an inductor in an H-bridge circuit;
a high side driver connected to drive one of the high side transistors;
a capacitor connected to provide a floating power supply to the high side driver that is referenced to the inductor; and
refresh circuitry to generate a refresh pulse that turns OFF the high side transistors to prevent boosting the voltage at the first terminal or the second terminal and turns ON the low side transistors to charge the capacitor thereby refreshing the capacitor.

16. The battery charging circuit of claim 15 wherein the buck boost circuit further has a third terminal configured to connect to an electronic circuit, the buck boost circuit configured to deliver energy received at the first terminal to the third terminal.

17. A method in a battery charging circuit comprising:
generating a charge output configured to charge a battery by operating a buck boost circuit in a forward buck mode or a forward boost mode to provide power provided at a first terminal to a second terminal configured to connect to the battery;
operating the buck boost circuit in a reverse buck mode or a reverse boost mode to provide power received from the battery at the second terminal to the first terminal;
generating a signal representative of current flow in the second terminal using a current flow sensed in the first terminal when operating the buck boost circuit in the forward boost mode or the reverse buck mode;
generating a signal representative of current flow in the first terminal using a current flow sensed in the second terminal when operating the buck boost circuit in the forward buck mode or the reverse boost mode; and
operating the buck boost circuit in the forward buck mode or the forward boost mode to provide power provided at the first terminal to a third terminal configured to connect to an electronic device other than a battery,
wherein the buck boost circuit comprises
a pair of high side transistors and a pair of low side transistors for connection to an inductor in an H-bridge circuit;
a high side driver connected to drive one of the high side transistors;
a capacitor connected to provide a floating power supply to the high side driver that is referenced to the inductor;
refresh circuitry to generate a refresh pulse that turns OFF the high side transistors to prevent boosting the voltage at the first terminal or the second terminal and turns ON the low side transistors to charge the capacitor thereby refreshing the capacitor.

18. A battery charging circuit comprising:
a first terminal;
a second terminal configured to provide energy to a battery;
a power train having a connection to the first terminal and a connection to the second terminal, the power train having a forward boost mode operation and a forward buck mode operation to deliver energy received at the first terminal to the second terminal, the power train having a reverse boost mode operation and reverse buck mode operation to deliver energy received at the second terminal to the first terminal; and
a current sensor block connected to the first terminal and the second terminal, the current sensor block having a first operating mode to sense a current flow in the first terminal and produce a signal indicative of a current flow in the second terminal based on a sensed current flow in the first terminal, the current sensor block further having a second operating mode to sense the current flow in the second terminal and produce a signal indicative of the current flow in the first terminal based on a sensed current flow in the second terminal,
wherein the current sensor block comprises a first current sensor connected to the first terminal and having a first master transistor, and a second current sensor connected to the second terminal and having a second master transistor,
wherein the power train comprises a first switching circuit and a second switching circuit,
wherein a first transistor of the first switching circuit and the first master transistor are the same transistor,
wherein a first transistor of the second switching circuit and the second master transistor are the same transistor.

19. The battery charging circuit of claim 18 wherein the power train comprises:
a pair of high side transistors and a pair of low side transistors for connection to an inductor in an H-bridge circuit;
a high side driver connected to drive one of the high side transistors;
a capacitor connected to provide a floating power supply to the high side driver that is referenced to the inductor;
refresh circuitry to generate a refresh pulse that turns OFF the high side transistors to prevent boosting the voltage at the first terminal or the second terminal and turns ON the low side transistors to charge the capacitor thereby refreshing the capacitor.

* * * * *